US012795320B2

(12) United States Patent
Watanabe

(10) Patent No.: US 12,795,320 B2
(45) Date of Patent: Nov. 10, 2026

(54) INFORMATION PROCESSING DEVICE, INFORMATION PROCESSING METHOD AND INFORMATION PROCESSING PROGRAM

(71) Applicant: Sony Group Corporation, Tokyo (JP)

(72) Inventor: Ryutaro Watanabe, Tokyo (JP)

(73) Assignee: Sony Group Corporation, Tokyo (JP)

( * ) Notice: Subject to any disclaimer, the term of this patent is extended or adjusted under 35 U.S.C. 154(b) by 280 days.

(21) Appl. No.: 18/706,986

(22) PCT Filed: Nov. 2, 2022

(86) PCT No.: PCT/JP2022/041009
§ 371 (c)(1),
(2) Date: May 2, 2024

(87) PCT Pub. No.: WO2023/085186
PCT Pub. Date: May 19, 2023

(65) Prior Publication Data

US 2026/0164210 A1 Jun. 11, 2026

(30) Foreign Application Priority Data

Nov. 9, 2021 (JP) ................................ 2021-182331

(51) Int. Cl.
*H04S 7/00* (2006.01)
*H04S 3/00* (2006.01)

(52) U.S. Cl.
CPC .............. *H04S 7/304* (2013.01); *H04S 3/008* (2013.01); *H04S 7/306* (2013.01);
(Continued)

(58) Field of Classification Search
CPC .......... H04S 7/304; H04S 3/008; H04S 7/306; H04S 2400/01; H04S 2400/11; H04S 2400/15; H04S 2420/01; H04S 2420/11
(Continued)

(56) References Cited

U.S. PATENT DOCUMENTS 10,609,504 B2 * 3/2020 Park ........................ G10L 21/02
11,070,930 B2 * 7/2021 Milne .................. G06F 3/0488
(Continued)

FOREIGN PATENT DOCUMENTS

JP 2016-523466 A 8/2016
JP 2020-025309 A 2/2020

OTHER PUBLICATIONS

International Search Report and English translation thereof mailed Dec. 20, 2022 in connection with International Application No. PCT/JP2022/041009.

*Primary Examiner* — Xu Mei
(74) *Attorney, Agent, or Firm* — Wolf, Greenfield & Sacks, P.C.

(57) ABSTRACT

An information processing device (100) includes a first generation unit (132) that generates a first sound signal on a basis of positional relationship information indicating a relationship between a listener and a sound source position and a head-related transfer function corresponding to the sound source position, a second generation unit (133) that generates a second sound signal on a basis of ambisonics format data generated from a partial component out of information indicating an acoustic characteristic in a reproduction environment, and a third generation unit (134) that generates a reproduction signal by synthesizing the first sound signal with the second sound signal.

14 Claims, 13 Drawing Sheets

(52) U.S. Cl.
CPC ....... *H04S 2400/01* (2013.01); *H04S 2400/11* (2013.01); *H04S 2400/15* (2013.01); *H04S 2420/01* (2013.01); *H04S 2420/11* (2013.01)

(58) Field of Classification Search
USPC ................................ 381/1, 17–23, 303, 119
See application file for complete search history.

(56) References Cited

U.S. PATENT DOCUMENTS

| | | | | |
|---|---|---|---|---|
| 11,076,257 | B1 * | 7/2021 | Sunder | H04S 7/304 |
| 11,265,672 | B2 * | 3/2022 | Neukam | G10L 19/008 |
| 2014/0355795 | A1 | 12/2014 | Xiang et al. | |
| 2020/0382895 | A1 | 12/2020 | Schissler | |
| 2021/0112361 | A1 | 4/2021 | Mindlin et al. | |
| 2022/0030372 | A1 * | 1/2022 | Sen | G10L 19/0204 |
| 2022/0386057 | A1 * | 12/2022 | Taguchi | H04R 3/12 |
| 2025/0126430 | A1 * | 4/2025 | Watanabe | H04S 7/304 |

* cited by examiner

121

| USER ID | HRTF DATA | ... |
|---|---|---|
| ... | ... | ... |
| U01 | A01 | ... |
| ... | ... | ... |

INFORMATION PROCESSING DEVICE, INFORMATION PROCESSING METHOD AND INFORMATION PROCESSING PROGRAM

CROSS REFERENCE TO RELATED APPLICATIONS

This is a U.S. National Stage Application under 35 U.S.C. § 371, based on International Application No. PCT/JP2022/041009, filed Nov. 2, 2022, which claims priority to Japanese Patent Application JP 2021-182331, filed Nov. 9, 2021, each of which is hereby incorporated by reference in its entirety.

FIELD

The present disclosure relates to an information processing device, an information processing method and an information processing program. Specifically, the present disclosure relates to processing of generating a binaural sound signal.

BACKGROUND

A technique of stereophonically reproducing a sound image in a headphone or the like by using a head-related transfer function (HRTF) mathematically representing how a sound reaches from a sound source to an ear is used. In addition to the HRTF, a room impulse response (RIR) indicating an acoustic characteristic of a propagation path such as an indoor environment in which a sound is emitted, a head-related impulse response (HRIR) representing a change in an acoustic characteristic by a head, a binaural room impulse response (BRIR) which is a response obtained by combining the RIR with the HRIR, and the like are also used for stereophonic sound reproduction and virtual representation of a sound.

For example, proposed is a technique of performing highly accurate sound source virtualization processing by convolving each of channels of a multi-channel sound signal with a BRIR and collectively processing late reverberation portions on a different system.

CITATION LIST

Patent Literature

Patent Literature 1: JP 2020-25309 A

SUMMARY

Technical Problem

According to the conventional technique, externalization of a sound image can be enhanced. However, in the conventional technique, it is practically difficult to generate a highly accurate binaural sound signal.

For example, in order to accurately reproduce an acoustic characteristic of a space using the BRIR, the BRIR needs to be measured in advance in all positions and orientations in the space. This is not realistic in terms of time and effort. That is, highly accurate virtualization can be performed only in the position and orientation of the user when the BRIR is measured.

Under such circumstances, the present disclosure proposes an information processing device, an information processing method and an information processing program capable of generating a binaural sound signal capable of highly accurate virtual representation.

Solution to Problem

In order to solve the above problems, an information processing device according to one embodiment of the present disclosure includes a first generation unit that generates a first sound signal on a basis of positional relationship information indicating a relationship between a listener and a sound source position and a head-related transfer function corresponding to the sound source position, a second generation unit that generates a second sound signal on a basis of ambisonics format data generated from a partial component out of information indicating an acoustic characteristic in a reproduction environment, and a third generation unit that generates a reproduction signal by synthesizing the first sound signal with the second sound signal.

DESCRIPTION OF EMBODIMENTS

Hereinbelow, embodiments of the present disclosure will be described in detail with reference to the drawings. Note that, in each of the following embodiments, identical components are labeled with the same reference signs, and duplicate description is omitted.

The present disclosure will be described in the following order of items.

1. First Embodiment
   1-1. Overview of Information Processing According to First Embodiment 1-2. Configuration of Information Processing Device According to First Embodiment
1-3. Modification Examples of First Embodiment
2. Second Embodiment
3. Third Embodiment
4. Fourth Embodiment
5. Fifth Embodiment
6. Sixth Embodiment
7. Seventh Embodiment
8. Eighth Embodiment
9. Ninth Embodiment
10. Other Embodiments
11. Effects of Information Processing Device According to Present Disclosure
12. Hardware Configuration

1. First Embodiment

1-1. Overview of Information Processing According to First Embodiment

Figure 1:
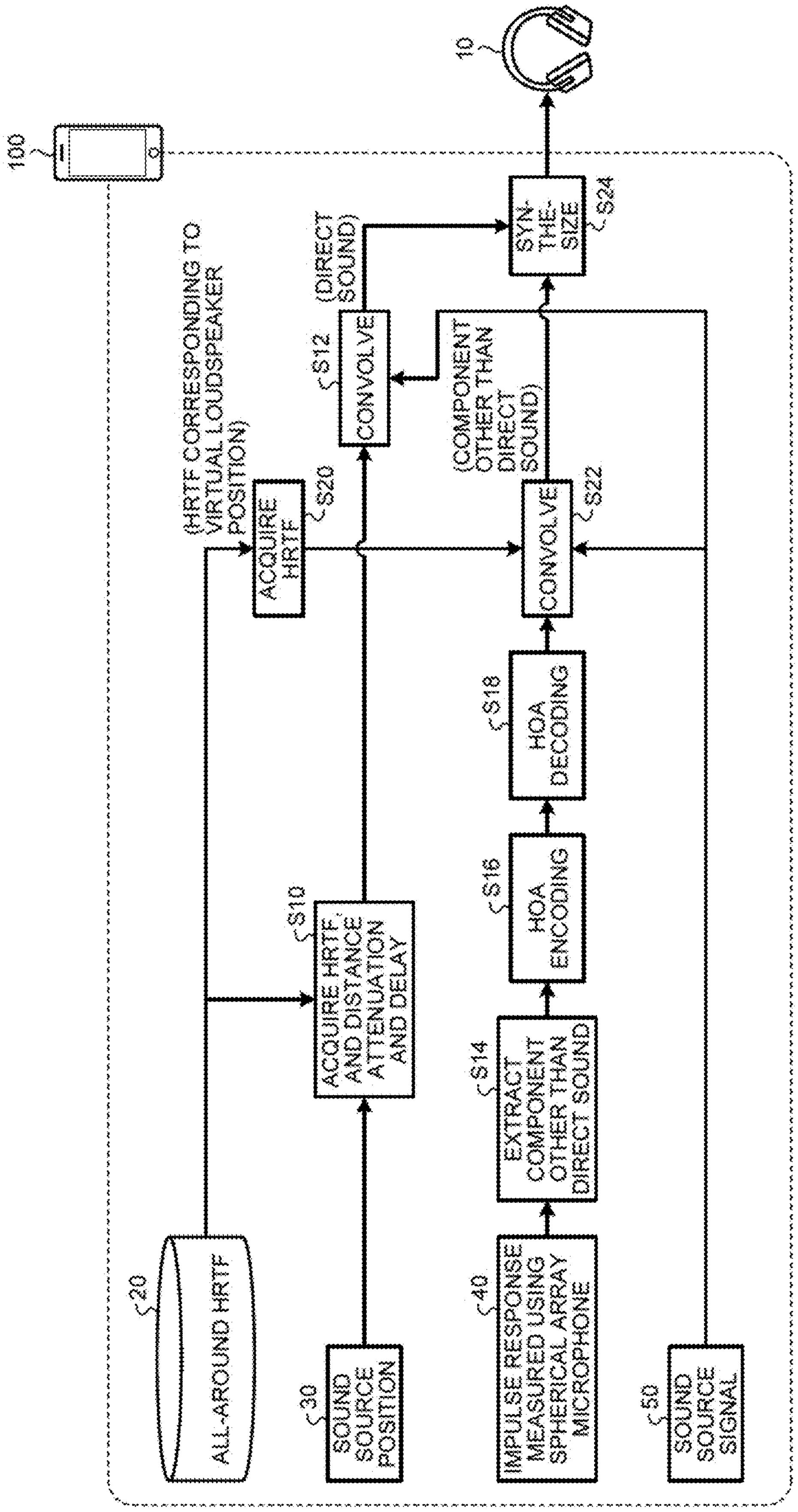
FIG. 1 is a conceptual diagram illustrating information processing according to a first embodiment.

First, information processing according to a first embodiment will be described with reference to FIG. 1. FIG. 1 is a conceptual diagram illustrating information processing according to the first embodiment.

An information processing device 100 illustrated in FIG. 1 is an example of an information processing device according to the present disclosure, and is used by a sound listener (hereinbelow, referred to as a "user"). For example, the information processing device 100 is a smartphone or a tablet terminal. The information processing device 100 generates a binaural sound signal on the basis of information processing according to the present disclosure, and transmits the generated binaural sound signal to a reproduction device 10 using a wired or wireless network.

The reproduction device 10 is a device used by the user to listen to a sound signal, and is a headphone, an earphone, a loudspeaker, or the like. The reproduction device 10 receives the binaural sound signal generated by the information processing device 100 and reproduces the binaural sound signal according to the user's operation. The reproduction device 10 may receive the sound signal by wired connection or may receive the sound signal via a wireless network such as Bluetooth (registered trademark).

The binaural sound signal is used to represent a virtual sound in a game, a stereophonic sound in a movie, and the like. As an example, the binaural sound signal is used to provide a sense of reality or a sense of immersion to the user in virtual reality (VR) or augmented reality (AR) content. As described above, the binaural sound signal is obtained by convolving an original sound signal generated from a sound source with a BRIR. However, in order to accurately reproduce an acoustic characteristic of a space using the BRIR, the BRIR needs to be measured in advance in all positions and orientations in the space. This is not realistic in terms of time and effort. That is, highly accurate virtualization can be performed only in the position and orientation of the user when the BRIR is measured.

Also, as another method of representing the acoustic characteristic, there is a method of measuring an impulse response (IR) from a target sound source using a spherical array microphone and representing the IR as a high order ambisonics (HOA) signal. By using the HOA signal, the sound field can be rotated according to the user's orientation at the time of listening, so that the reproducibility of the sound field can be improved.

However, it is difficult to generate a high quality HOA signal from a signal collected by the spherical array microphone. In addition, in the case of using low-order HOA representation including a first order ambisonics (FOA) signal, it is difficult to virtually reproduce the sound field with high accuracy.

Under such circumstances, the information processing device 100 according to the present disclosure generates a binaural sound signal capable of highly accurate virtual representation by means of the following information processing. Specifically, the information processing device 100 generates a direct sound component and a reflected sound (reverberation sound) component, out of a sound signal actually listened to by the user, by separate methods, and synthesizes the direct sound component with the reflected sound component to generate a binaural sound signal. Hereinbelow, information processing executed by the information processing device 100 will be described in order with reference to FIG. 1.

In the example illustrated in FIG. 1, the information processing device 100 holds in advance an all-around HRTF 20 of the user and an impulse response (IR) 40 which is information indicating an acoustic characteristic in a reproduction environment and measured using a spherical array microphone.

The HRTF is a transfer function that represents a change in a sound caused by a shape of a peripheral object such as an auricle (auricula), a head, and the like of a human. In general, measurement data for deriving the HRTF is acquired by measuring an acoustic signal for measurement using a microphone worn by a human in his/her auricle, a dummy head microphone, or the like. The acoustic signals for measurement are generated from a sound source (for example, a loudspeaker) that turns around the user or a large number of sound sources arranged around the user at various angles to the user and are measured at a user's position to acquire the all-around HRTF 20 of the user.

The IR 40 is obtained by installing a spherical array microphone in a room to be virtually represented and measuring an acoustic signal for measurement generated from a sound source with the spherical array microphone. For example, in a case where an acoustic characteristic of a specific movie theater or audio-visual room is to be reproduced by virtual representation, a spherical array microphone is installed in the movie theater or audio-visual room, and the IR 40 in the reproduction environment is measured. Note that, in a case where a virtual space in content such as a game is represented, the IR 40 is measured on the basis of an acoustic simulation in which the space is reproduced on a computer. In the example illustrated in FIG. 1, the IR 40 is an acoustic characteristic obtained by measuring a sound emitted from the position of a sound source with a spherical array microphone installed at a listening position (that is, a user's position).

Figure 2:
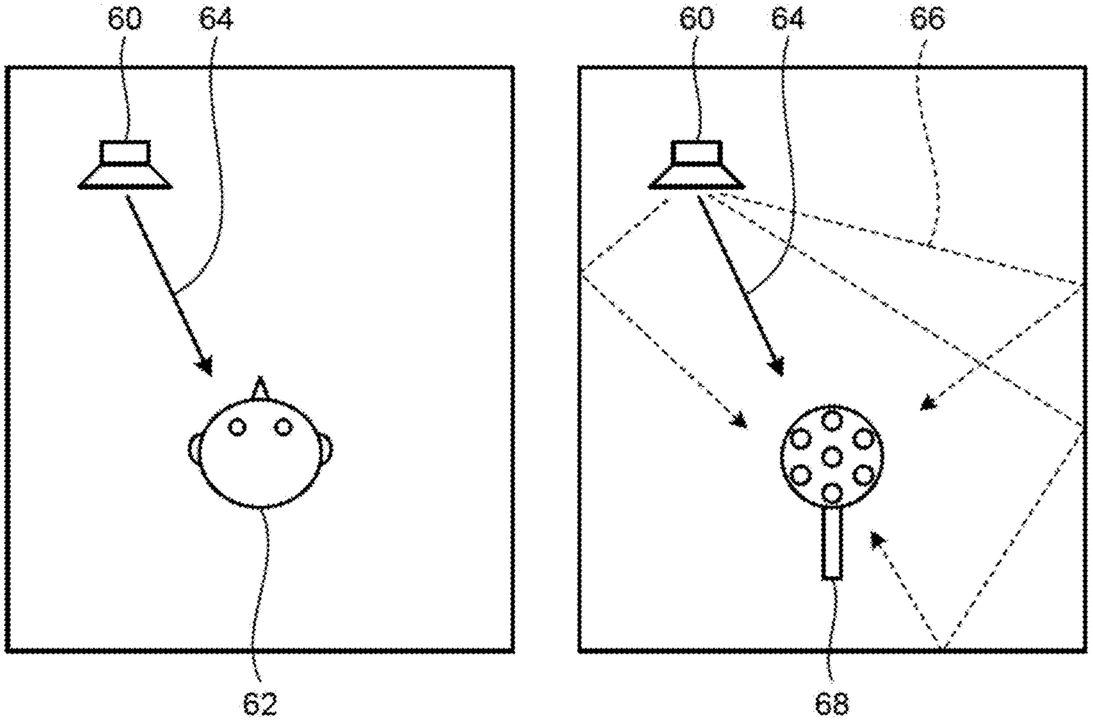
FIG. 2 is a schematic diagram for explaining measurement data used in the information processing.

Here, the all-around HRTF 20 and the IR 40 will be described with reference to FIG. 2. FIG. 2 is a schematic diagram for explaining measurement data used in the information processing. In the example illustrated in FIG. 2, in a case where the indoor environment is assumed as a free sound field, a sound emitted from a sound source 60 is measured by microphones installed in both ears of a user 62, and observed changes in the physical characteristic of a direct sound component 64 are expressed in a frequency domain, to derive the HRTF. In the case of measuring the all-around HRTF 20, the sound source 60 is moved to places around the user at various angles to the user using a dedicated measurement facility or the like. Furthermore, in the example illustrated in FIG. 2, a sound emitted from the sound source 60 is measured by a spherical array microphone 68, and observed changes in the physical characteristics of the direct sound component 64 and a reflected sound component 66 observed are expressed in a time domain, to derive the IR 40. In a case where the HRTF is expressed in a time domain, an HRIR is derived, and in a case where the HRTF is expressed in a time domain by including a propagation path (RIR) from a sound source to both ears, a BRIR is derived. In the following description, expressions of the HRTF and the IR are used, but the information processing device 100 may use the BRIR or the like instead of the HRTF according to the configurations of the information processing device 100 and the reproduction device 10, and the reproduction environment.

Returning to FIG. 1, description is continued. In the example illustrated in FIG. 1, in a case where a binaural sound signal is generated from a sound source signal 50, which is a sound signal generated from a sound source, the information processing device 100 first specifies a sound source position 30. The sound source position 30 is information indicating a positional relationship between the user and the sound source, and is, for example, a distance and an angle between the user and the sound source. The sound source signal 50 is a sound signal generated from the sound source (for example, a virtual loudspeaker in a pseudo space). Note that the sound source signal 50 may include not only the sound signal but also the size, positional information, and the like of the sound source. That is, the sound source position 30 may be included in the sound source signal 50. For example, in the case of content such as a game, the sound source signal 50 generated in a certain scene includes information indicating the distance and angle from the user. Note that the information processing device 100 may acquire information indicating the relationship between the user's position (listening point) and the sound source position 30 (the information is hereinbelow referred to as "positional relationship information"). In a case of a sound source for which a listening point is set in advance, the information processing device 100 estimates the listening point as the user's position. Furthermore, in a case where the user's position can be acquired separately from the listening point, the information processing device 100 may acquire the positional relationship information on the basis of the position. For example, in a case where the reproduction device 10 is a head mounted display (HMD), the reproduction device 10 tracks the head's orientation (the orientation of the line of sight) and the user's position in accordance with the movement of the user, and transmits the tracking information to the information processing device 100. The information processing device 100 calculates the positional relationship information indicating the relationship between the sound source and the user on the basis of the tracking information received from the reproduction device 10 and the sound source position 30. Note that information processing based on the orientation and position of the user will be described in detail in third and subsequent embodiments.

Then, the information processing device 100 acquires an HRTF corresponding to the positional relationship information out of the all-around HRTF 20 (Step S10). Furthermore, the information processing device 100 performs processing regarding distance attenuation (gain) and delay on the HRTF corresponding to the positional relationship information. For example, the sound signal reproduced by the reproduction device 10 is attenuated and delayed more significantly as the distance between the user and the sound source is longer.

Subsequently, the information processing device 100 convolves the sound source signal 50 with the HRTF on which the processing regarding the distance attenuation and delay has been performed (Step S12). The sound source signal 50 in Step S12 is a direct sound (component not including a reflected sound) since the sound source signal 50 does not include the IR 40 indicating the acoustic characteristic (such as reverberation time) in the room. In this manner, the information processing device 100 generates the signal corresponding to the direct sound component out of the binaural sound signal to be reproduced by the reproduction device 10 by convolving the sound source signal with the HRTF corresponding to the positional relationship information.

On the other hand, the information processing device 100 generates a signal corresponding to a component other than the direct sound component out of the binaural sound signal to be reproduced by the reproduction device 10 by using a different method from Step S12.

First, the information processing device 100 extracts a component other than the direct sound from the IR 40 indicating the acoustic characteristic of the reproduction environment (Step S14). Since the IR 40 indicates the reverberation component in the room on the time axis, the information processing device 100 can extract the component other than the direct sound, for example, by extracting a component other than the signal measured as the direct sound (for example, a component of an initial reflected sound and thereafter). Furthermore, the information processing device 100 may extract the component other than the direct sound using various known techniques.

Then, the information processing device 100 performs HOA encoding on the extracted component (Step S16). That is, the information processing device 100 extracts the component other than the direct sound out of the IR 40 as an HOA signal. Thereafter, the information processing device 100 executes HOA decoding (Step S18).

Note that the information processing device 100 may execute the HOA decoding according to the processing capability of the device itself. Specifically, the information processing device 100 may execute the HOA decoding by adjusting the order of expanding the HOA signal so as to achieve a data rate at which a delay of a predetermined time or more does not occur in reproduction by the reproduction device 10.

Subsequently, the information processing device 100 acquires, out of the all-around HRTF 20, an HRTF corresponding to a loudspeaker position (virtual loudspeaker position) in a case where the HOA signal is reproduced in a multichannel loudspeaker environment (Step S20). Then, the information processing device 100 convolves the signal obtained by decoding the HOA signal in Step S18, the HRTF acquired in Step S20, and the sound source signal 50 with one another (Step S22). The sound signal generated in Step S22 is a binaural sound signal including the component other than the direct sound out of the sound source signal 50.

Then, the information processing device 100 synthesizes the direct sound component obtained in Step S12 with the component other than the direct sound obtained in Step S22 (Step S24). In this manner, the information processing device 100 generates a binaural sound signal to be reproduced by the reproduction device 10.

In the above manner, the information processing device 100 generates a first sound signal on the basis of the positional relationship information and the HRTF corresponding to the sound source position. The information processing device 100 also generates a second sound signal on the basis of the HOA format data generated from a partial component other than the direct sound out of the IR 40 indicating the acoustic characteristic in the reproduction environment. Then, the information processing device 100 synthesizes the first sound signal with the second sound signal to generate a binaural sound signal.

In this manner, the information processing device 100 performs the convolution of the HRTF with the sound source signal 50, which enables highly accurate reproduction, to reproduce the direct sound having a large influence on the perception in the virtual reproduction. Furthermore, the information processing device 100 uses the HOA to reproduce the component other than the direct sound (component such as reflection, reverberation, and the like in the indoor space) having a relatively smaller influence on the perception than the direct sound. As a result, the information processing device 100 can provide a binaural sound signal that does not make the user feel strange while achieving the sound field expression using the HOA. That is, the information processing device 100 can perform virtual representation supporting 3 degree of freedom (DoF), which is head tracking, and the like while reducing the processing load.

Figures 3, 4:
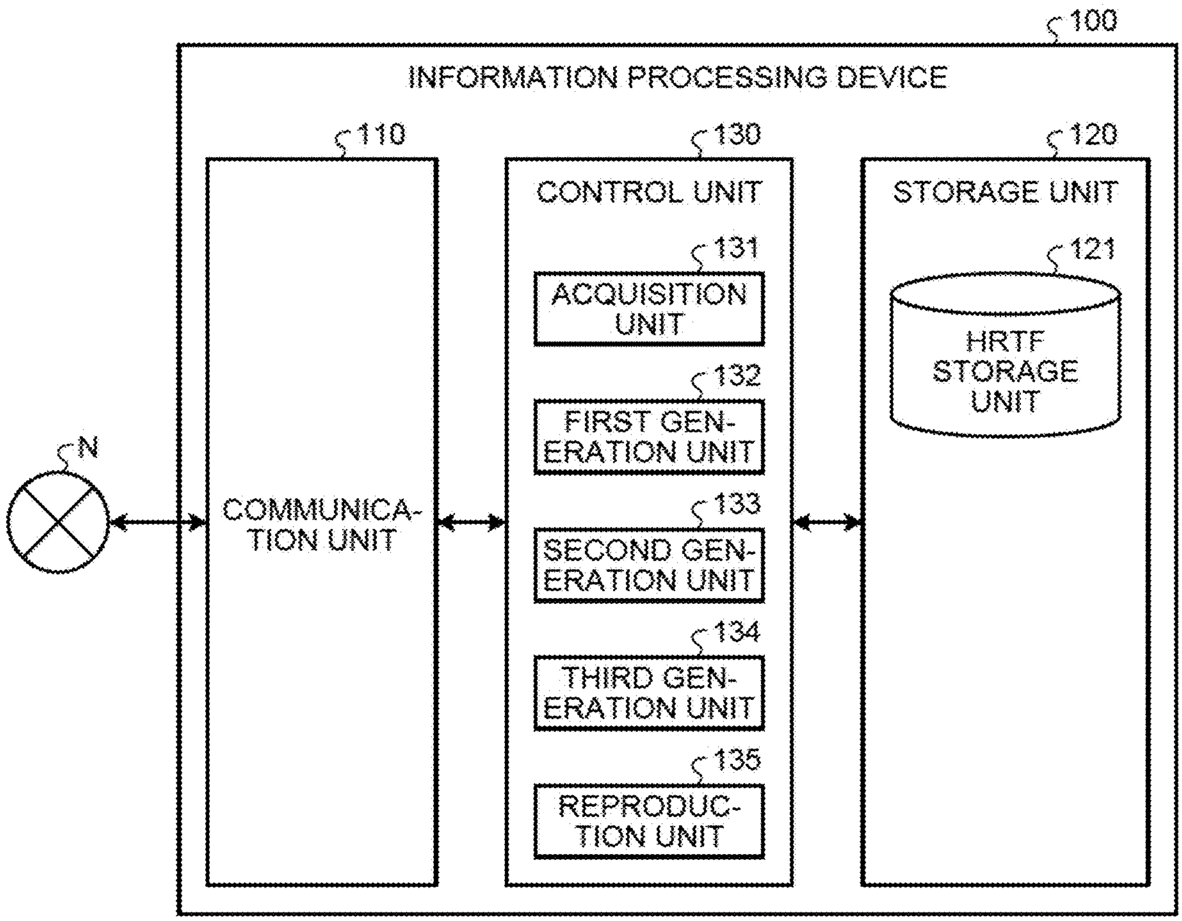
FIG. 3 is a diagram illustrating a configuration example of an information processing device according to the first embodiment.
FIG. 4 is a diagram illustrating an example of an HRTF storage unit 121 of the present disclosure.

1-2. Configuration of Information Processing Device According to First Embodiment Next, a configuration of the information processing device 100 according to the first embodiment will be described with reference to FIG. 3. FIG. 3 is a diagram illustrating a configuration example of the information processing device 100 according to the first embodiment.

As illustrated in FIG. 3, the information processing device 100 includes a communication unit 110, a storage unit 120, and a control unit 130. Note that the information processing device 100 may include an input unit (for example, a touch panel) that receives various operations from the user or the like who operates the information processing device 100, and a display unit (for example, a liquid crystal display) for displaying various types of information.

The function of the communication unit 110 is fulfilled by, for example, a network interface card (NIC).

The communication unit 110 is connected to a network N (Internet, near field communication (NFC), Bluetooth, or the like) in a wired or wireless manner, and transmits and receives information to and from the reproduction device 10 and the like via the network N.

The function of the storage unit 120 is fulfilled by, for example, a semiconductor memory element such as a random access memory (RAM) and a flash memory, or a storage device such as a hard disk and an optical disk. As illustrated in FIG. 3, the storage unit 120 includes an HRTF storage unit 121. Note that, although not illustrated, the storage unit 120 may store various data other than the HRTF used for the information processing, the sound source signal 50 serving as the source of the sound reproduced by the reproduction device 10, and the like.

The HRTF storage unit 121 stores the HRTF corresponding to the user. FIG. 4 illustrates an example of the HRTF storage unit 121 according to the present disclosure. FIG. 4 is a diagram illustrating an example of the HRTF storage unit 121 of the present disclosure. In the example illustrated in FIG. 4, the HRTF storage unit 121 includes items such as "user ID" and "HRTF data".

The "user ID" indicates identification information for identifying the user as a listener. The "HRTF data" indicates the HRTF corresponding to the user. In FIG. 4, the data in each item is conceptually described as "U01" or "A01", but in practice, specific data corresponding to each item is stored as the data in each item. Furthermore, the HRTF storage unit 121 may store not only the HRTF corresponding to each user but also general-purpose HRTF data acquired from a plurality of users.

Returning to FIG. 3, description is continued. The function of the control unit 130 is fulfilled by, for example, a central processing unit (CPU), a micro processing unit (MPU), or the like executing a program (for example, an information processing program according to the present disclosure) stored in the information processing device 100 with a random access memory (RAM) or the like used as a working area. Note that the control unit 130 may be a controller and be achieved by an integrated circuit such as an application specific integrated circuit (ASIC) and a field programmable gate array (FPGA).

As illustrated in FIG. 3, the control unit 130 includes an acquisition unit 131, a first generation unit 132, a second generation unit 133, a third generation unit 134, and a reproduction unit 135, and fulfills or executes a function or an action of information processing described below. Note that the internal configuration of the control unit 130 is not limited to the configuration illustrated in FIG. 3, and may be another configuration that performs information processing described below.

The acquisition unit 131 acquires various types of information. For example, the acquisition unit 131 acquires the all-around HRTF 20 measured for each user. The acquisition unit 131 also acquires the IR 40 that is information indicating the acoustic characteristic in the reproduction environment. The acquisition unit 131 stores the acquired information in the storage unit 120.

The first generation unit 132 generates a first sound signal on the basis of the positional relationship information indicating the relationship between the user and the sound source position and the HRTF corresponding to the sound source position. The first sound signal is a sound signal generated in Step S12 illustrated in FIG. 1, and is a sound signal corresponding to the component of the direct sound out of the sound to be reproduced by the reproduction device 10.

Specifically, the first generation unit 132 performs processing regarding distance attenuation and delay with respect to the sound source on the basis of the positional relationship information, and then convolves the HRTF corresponding to the sound source position with the sound source signal 50 to generate the first sound signal.

The second generation unit 133 generates a second sound signal on the basis of the HOA signal (ambisonics format data) generated from the partial component out of the information indicating the acoustic characteristic in the reproduction environment. The second sound signal is a sound signal generated in Step S22 illustrated in FIG. 1, and is a sound signal corresponding to the component other than the direct sound out of the sound to be reproduced by the reproduction device 10.

Specifically, the second generation unit 133 extracts the partial component out of the IR 40 in the reproduction environment as information indicating the acoustic characteristic in the reproduction environment, and generates the second sound signal on the basis of the extracted partial component.

More specifically, the second generation unit 133 extracts the partial component out of the IR 40 other than the component corresponding to the direct sound, and generates the second sound signal on the basis of the extracted partial component. For example, the second generation unit 133

HOA-encodes and decodes the partial component other than the component corresponding to the direct sound, and convolves such data with the HRTF corresponding to the virtual loudspeaker position to generate the second sound signal.

The third generation unit 134 synthesizes the first sound signal generated by the first generation unit 132 with the second sound signal generated by the second generation unit 133 to generate a reproduction signal to be reproduced by the reproduction device 10. Specifically, the third generation unit 134 generates the reproduction signal by synthesizing the first sound signal corresponding to the direct sound out of the reproduction signal with the second sound signal including the component other than the direct sound out of the reproduction signal. That is, the third generation unit 134 generates the reproduction signal by using both a first processing method based on the HRTF and a second processing method based on the HOA.

The reproduction unit 135 performs control so that the reproduction device 10 will reproduce the reproduction signal generated by the third generation unit 134. For example, the reproduction unit 135 transmits the reproduction signal to the reproduction device 10 connected in a wireless manner or the like, and reproduces the reproduction signal in response to the operation in the reproduction device 10.

1-3. Modification Examples of First Embodiment

The information processing according to the first embodiment described above may be modified in various ways. Hereinbelow, modification examples of the first embodiment will be described.

(1-3-1. Acquisition of HRTF and IR)

In the first embodiment, an example has been described in which the information processing device 100 stores the HRTF measured by the measuring instrument or the like in the storage unit 120. However, the information processing device 100 may acquire the HRTF using various known methods. For example, the information processing device 100 may construct a 3D model of the ear and head of the user on the basis of an ear image or head image thereof, perform acoustic simulation on the constructed 3D model, and perform pseudo measurement to acquire the HRTF. Alternatively, the information processing device 100 may calculate the HRTF according to the size information of the ear and head of the user and acquire the calculated HRTF. Furthermore, in a case where the HRTF of the user cannot be acquired, the information processing device 100 may use a general-purpose HRTF.

Furthermore, the information processing device 100 does not always need to hold a high-density HRTF such as the all-around HRTF 20. In this case, the information processing device 100 may execute the processing using the HRTF corresponding to the position close to the sound source position out of the held HRTFs.

Furthermore, the information processing device 100 may also acquire the IR 40 not by actual acoustic measurement but by acoustic simulation. In this case, since a freely-selected sound source position and listening position can be set in simulation, the information processing device 100 can easily acquire the IR 40. Furthermore, the information processing device 100 may acquire the IR 40 by performing real-time processing at the time of reproduction of the sound signal, instead of acquiring the IR 40 in advance. For example, in the case of content such as a game, the information processing device 100 can specify the position of the user who is playing the game and acquire the IR 40 at the position in the game. In particular, in a case where geometric acoustic simulation is used, the information processing device 100 can clearly specify the coming directions, the intensities, and the delay amounts of the direct sound and the reflected sound, and thus can easily acquire the component other than the direct sound.

(1-3-2. Sound Source)

There are various examples of the sound source described in the first embodiment. For example, in a case where the virtual reproduction environment is assumed to be a listening room or a movie theater, the sound source is a loudspeaker installed in the listening room or the movie theater. In this case, the sound source position 30 is fixed to the installation position of the loudspeaker. Note that, in a virtual environment, the user can freely designate the sound source position 30. Furthermore, in a case where the virtual reproduction environment is content such as a game, the information processing device 100 can acquire the position of an object designated as the sound source in real time when reproducing the sound signal. Note that the information processing device 100 may add a transfer characteristic of a reproduction system when generating the binaural signal from the direct sound component. That is, the impulse response recorded by installing the microphone in the sound reception position of the listening room or the like includes a transfer characteristic of a reproduction system (an amplifier, a loudspeaker, or the like) installed in the space, and the component other than the direct sound generated from the sound collection data includes the transfer characteristic of the reproduction system. On the other hand, the direct sound component as described in the above embodiment does not include the transfer characteristic of the reproduction system since the direct sound component is generated by just directly convolving the sound source signal with the HRTF. As a result, a mismatch in the characteristic occurs between the direct sound and the sound other than the direct sound, which may lead to a strange feeling in listening. In order to avoid this, the information processing device 100 may perform processing of adding the transfer characteristic of the reproduction system to the direct sound for practical purposes.

(1-3-3. Extraction of Component Other Than Direct Sound)

In the first embodiment, an example has been described in which the information processing device 100 extracts the partial component other than the direct sound from the IR 40. However, the information processing device 100 may exclude not only the direct sound but also the initial reflected (first reflected) component or the like from the IR 40 depending on the influence on the user's perception. For example, the information processing device 100 calculates a ratio of the component amount of the direct sound to that of the reflected sound. Then, for example, in a case where the ratio of the direct sound is lower than a predetermined ratio, the information processing device 100 may add the initial reflected sound to the direct sound to adjust the ratio to the determined ratio and then determine the component to be separated. As a result, the information processing device 100 can generate the reproduction signal adjusted to a predetermined degree even in an environment where the direct sound is measured to be extremely large or in a converse environment where the direct sound is measured to be small due to an influence of an obstacle or the like.

Furthermore, the information processing device 100 may acquire shape information (for example, a length difference between the component generated by the closest reflector to the sound source and the direct sound) of the space in the reproduction environment at the time of extraction. For example, by calculating the difference of times and incident directions in which the direct sound component and the reflected sound component reach the listening position on the basis of the shape information, the information processing device 100 can easily separate the direct sound from the sound other than the direct sound. Furthermore, the information processing device 100 may perform 3D modeling on the space subjected to acoustic measurement, and perform geometric acoustic simulation, to separate the direct sound from the reflected sound of actual measurement data.

2. Second Embodiment

Next, a second embodiment will be described with reference to FIG. 5. In the second embodiment, a case where there are a plurality of sound sources for a sound signal to be reproduced will be described. Note that, in a case where similar processing to that of the first embodiment is performed, the description thereof will be omitted.

Figure 5:
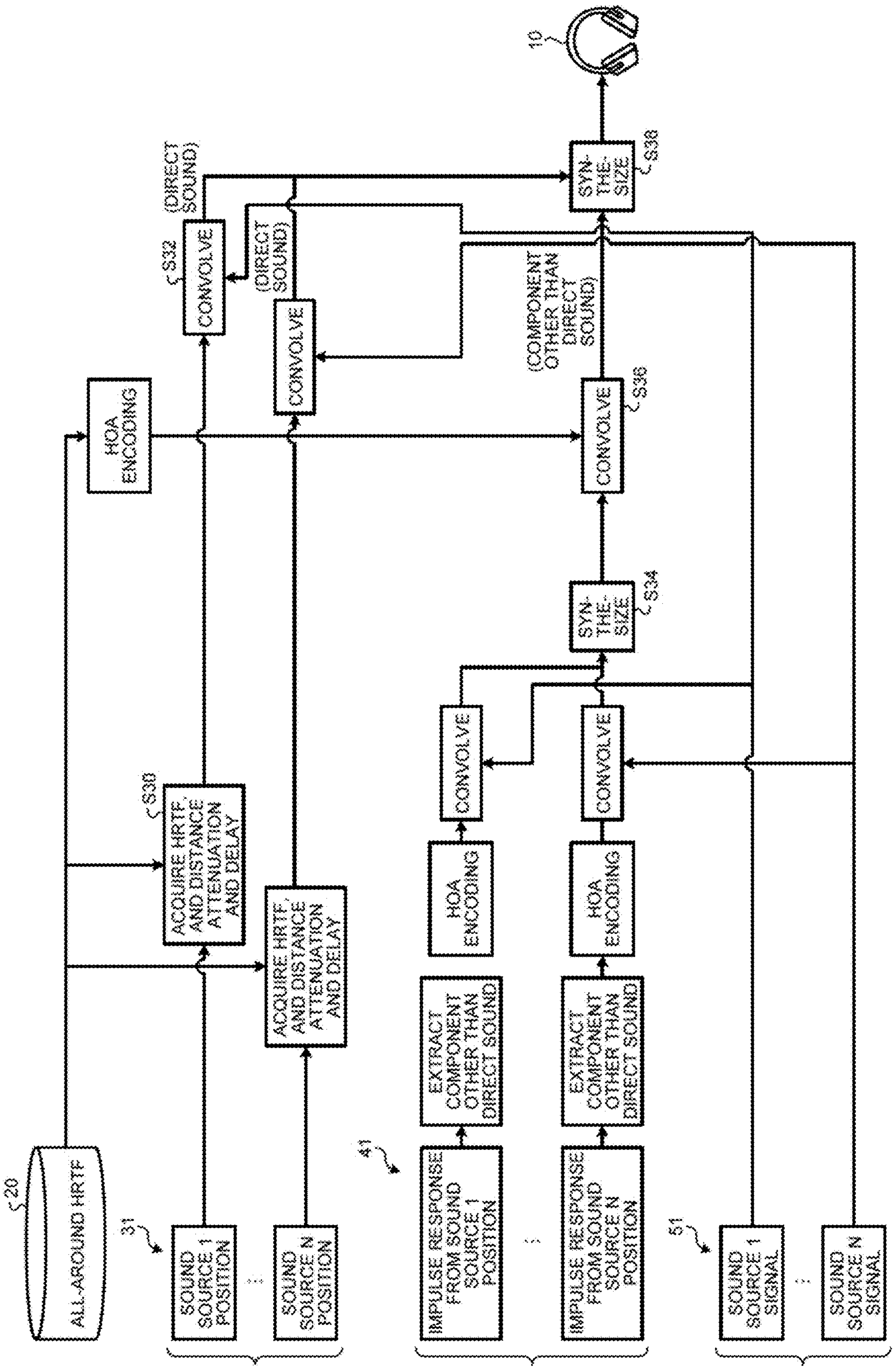
FIG. 5 is a conceptual diagram illustrating information processing according to a second embodiment.

FIG. 5 is a conceptual diagram illustrating information processing according to the second embodiment. As illustrated in FIG. 5, in the second embodiment, the information processing device 100 executes information processing according to the present disclosure using a plurality of sound source positions 31, a plurality of IRs 41, and a plurality of sound source signals 51. Note that a sound source N illustrated in FIG. 5 means an Nth sound source (N is a freely-selected natural number of two or more).

First, similarly to the first embodiment, the information processing device 100 specifies a sound source position and acquires an HRTF corresponding to the specified sound source position (Step S30). Furthermore, the information processing device 100 performs processing regarding distance attenuation and delay with respect to the sound source position. The information processing device 100 performs this processing on a plurality of sound sources (sound source 1 to sound source N).

Thereafter, the information processing device 100 convolves information obtained from each of the sound source positions with a sound source signal corresponding to each of the sound sources (Step S32). As a result, the information processing device 100 can obtain a direct sound component corresponding to each of the sound sources.

Furthermore, the information processing device 100 extracts a component other than the direct sound from the IR obtained by measuring each of the sound sources using a spherical array microphone, and performs HOA encoding on the extracted component, as in the first embodiment. In the second embodiment, the information processing device 100 may convolve the components obtained by HOA-encoding the IRs corresponding to the respective sound sources in a spherical harmonics domain and synthesize them (Step S34). Furthermore, in order to perform convolution in the spherical harmonics domain, the information processing device 100 also performs HOA encoding on the all-around HRTF 20, and convolves the component synthesized in Step S34 with the HRTF (Step S36). In the second embodiment, since there are a plurality of sound sources, it is necessary to convolve a plurality of "components other than the direct sounds" with the HRTF. However, as illustrated in FIG. 5, by synthesizing the plurality of "components other than the direct sounds" in advance, the information processing device 100 can reduce a processing load.

Thereafter, the information processing device 100 synthesizes the direct sound component generated in Step S32 with the component other than the direct sound generated in Step S36 to generate a binaural sound signal (Step S38).

As described above, the information processing device 100 according to the second embodiment extracts the partial components other than the components corresponding to the direct sounds from the IRs corresponding to the plurality of sound sources, and generates the plurality of HOA signals corresponding to the plurality of sound sources on the basis of the extracted partial components. Then, the information processing device 100 convolves the data obtained by synthesizing the plurality of generated HOA signals with the data obtained by subjecting the HRTF to spherical harmonics expansion to generate a second sound signal (a binaural sound signal including the components other than the direct sounds).

Accordingly, even in a case where the plurality of sound sources are present, the information processing device 100 can reproduce highly accurate virtual representation while reducing the processing load. For example, the information processing device 100 can reduce the number of times of convolution by synthesizing the plurality of components other than the direct sounds and convolving the synthesized data with the HRTF, so that the processing load can be reduced.

3. Third Embodiment

Next, a third embodiment will be described with reference to FIG. 6. In the third embodiment, an example in which the information processing device 100 acquires a user's orientation on the basis of tracking information or the like and generates a binaural sound signal in accordance with the acquired user's orientation will be described. Note that, in a case where similar processing to that of the first embodiment or the second embodiment is performed, the description thereof will be omitted.

Figure 6:
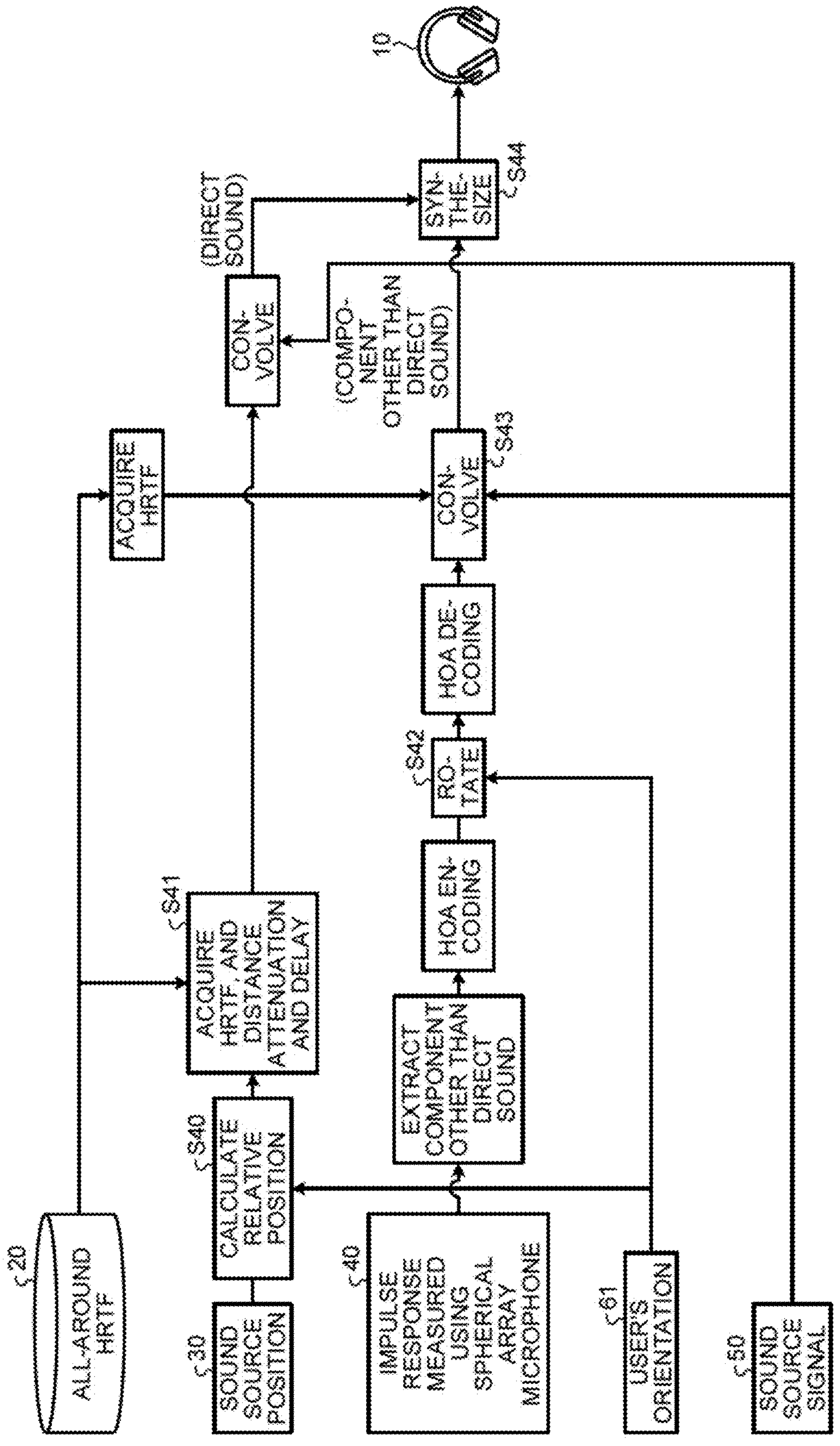
FIG. 6 is a conceptual diagram illustrating information processing according to a third embodiment.

FIG. 6 is a conceptual diagram illustrating information processing according to the third embodiment. As illustrated in FIG. 6, in the third embodiment, the information processing device 100 executes information processing according to the present disclosure on the basis of a user's orientation 61.

The information processing device 100 calculates a relative position between the sound source and the user on the basis of the user's orientation 61 as well as the sound source position 30 (Step S40). For example, the information processing device 100 calculates a relative position such as an angle at which the user faces the sound source. For example, in the case of content such as a game, the information processing device 100 calculates a relative position on the basis of a positional relationship between head tracking information by an HMD and an object set as the sound source.

Subsequently, the information processing device 100 acquires an HRTF corresponding to the relative position (the angle at which the user and the sound source face each other) and performs processing regarding distance attenuation and delay with respect to the sound source (Step S41). Then, the information processing device 100 convolves the result of the processing regarding distance attenuation and delay with respect to the relative position with the sound source signal 50 to generate a first sound signal (a sound signal corresponding to a direct sound component).

Furthermore, the information processing device 100 rotates an HOA signal with reference to the user's orientation 61 for a component other than the direct sound component, and sets a sound field according to the user's orientation (Step S42). For example, the information processing device 100 adjusts the coordinate system of the spherical array microphone when the IR 40 is measured (in which orientation the microphone faces with respect to the sound source, or the like) according to the user's orientation in the indoor space. Then, the information processing device 100 decodes the HOA signal to which the rotation processing has been applied, and convolves the signal obtained by the decoding, an HRTF corresponding to a virtual loudspeaker position, and the sound source signal 50 with one another to generate a second sound signal (a sound signal corresponding to the partial component other than the direct sound) (Step S43). Thereafter, the information processing device 100 synthesizes the first sound signal with the second sound signal to generate a binaural sound signal (Step S44).

In this manner, the information processing device 100 according to the third embodiment generates the second sound signal from the data obtained by rotating the HOA signal in the user's orientation on the basis of the positional relationship information, and generates the binaural sound signal on the basis of the generated second sound signal. As a result, the information processing device 100 can provide the binaural sound signal corresponding to the user's orientation with respect to the sound source, and can thus reproduce more highly accurate virtual representation.

4. Fourth Embodiment

Next, a fourth embodiment will be described with reference to FIG. 7. In the fourth embodiment, an example in which the information processing device 100 acquires a user's position on the basis of tracking information or the like and generates a binaural sound signal corresponding to the acquired user's position will be described. Note that, in a case where similar processing to those of the first to third embodiments is performed, the description thereof will be omitted.

Figure 7:
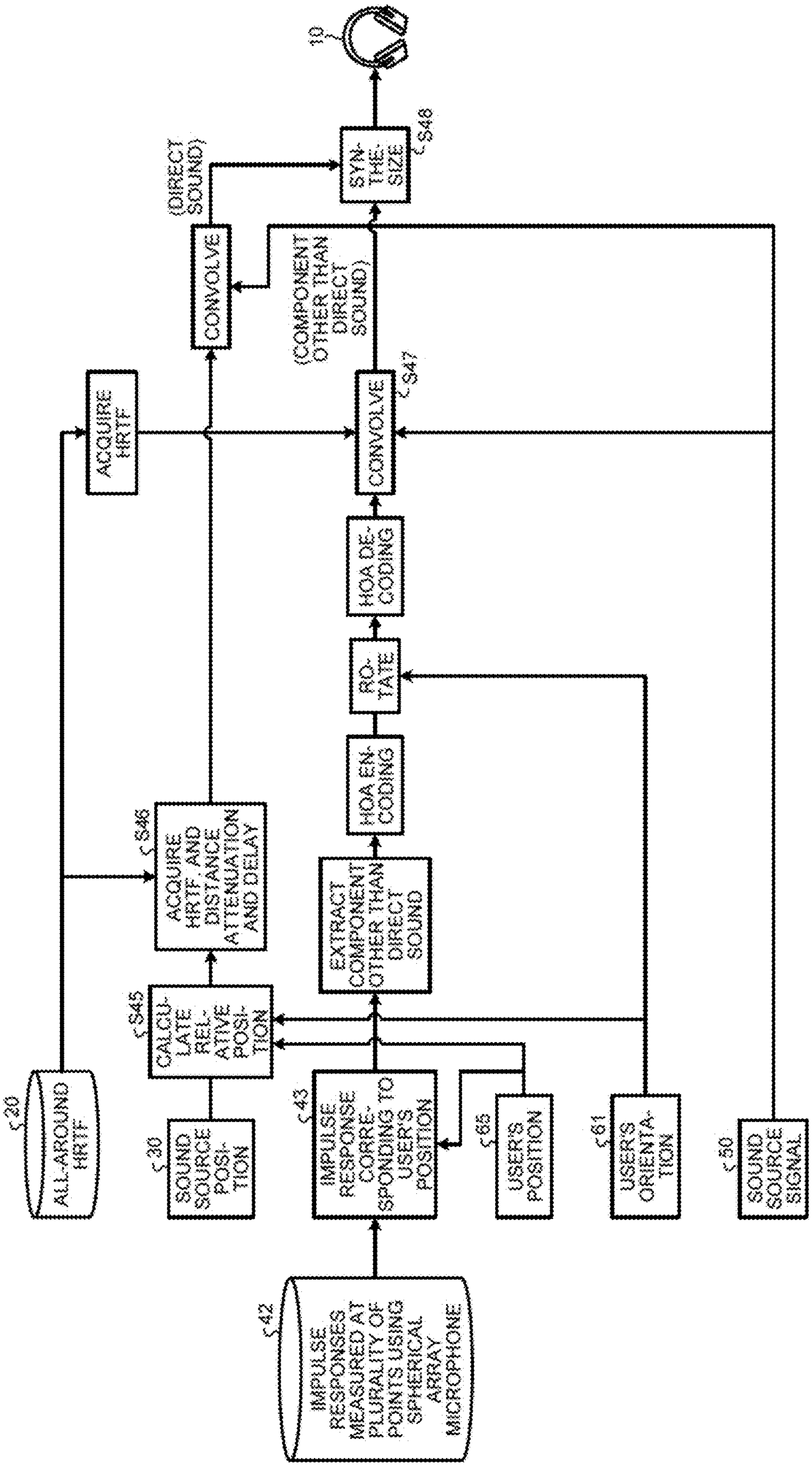
FIG. 7 is a conceptual diagram illustrating information processing according to a fourth embodiment.

FIG. 7 is a conceptual diagram illustrating information processing according to the fourth embodiment. As illustrated in FIG. 7, in the fourth embodiment, the information processing device 100 executes information processing according to the present disclosure on the basis of a user's position 65.

In the fourth embodiment, the information processing device 100 holds in advance an IR 42 measured at a plurality of points using a spherical array microphone in a reproduction environment. For example, the information processing device 100 may acquire the IR 42 actually measured at a plurality of points in a reproduction environment (a viewing room, a movie theater, or the like) for virtual representation, or may acquire the IR 42 in advance on the basis of a geometric simulation of the reproduction environment.

The information processing device 100 calculates a relative position between the sound source and the user on the basis of the user's orientation 61 and the user's position 65 as well as the sound source position 30 (Step S45). The information processing device 100 calculates a relative position such as a position where the user is located with respect to the sound source. For example, in the case of content such as a game, the information processing device 100 acquires positional information indicating at which position in the space in the content a character (for example, an avatar of the user in the virtual space, or the like) operated by the user is located, and specifies the position of the character as the user's position 65. Then, the information processing device 100 calculates the relative position on the basis of the specified user's position 65 and the user's orientation 61.

Subsequently, the information processing device 100 acquires an HRTF corresponding to the relative position (the angle at which the user and the sound source face each other and the distance) and performs processing regarding distance attenuation and delay with respect to the sound source (Step S46). Then, the information processing device 100 convolves the result of the processing regarding distance attenuation and delay with the sound source signal 50 to generate a first sound signal (a sound signal corresponding to a direct sound component).

Furthermore, in generating a component other than the direct sound component, the information processing device 100 first acquires an IR 43 corresponding to the user's position 65. Specifically, the information processing device 100 acquires the IR 43 corresponding to the user's position 65 from among the IRs 42 measured at the plurality of points. In this case, the information processing device 100 may extract the IR 43 closest to the user's position 65. Furthermore, the information processing device 100 may acquire the IR 43 corresponding to the user's position 65 by processing a plurality of signals instead of selecting one IR from the IRs 43. Furthermore, the information processing device 100 may calculate the IR 43 corresponding to the user's position 65 on the basis of the geometric simulation and acquire the calculated result.

Thereafter, the information processing device 100 extracts the component other than the direct sound from the IR 43, and generates a second sound signal (a sound signal corresponding to the partial component other than the direct sound) from the information obtained by rotating the HOA signal in accordance with the user's orientation 61 (Step S47). Thereafter, the information processing device 100 synthesizes the first sound signal with the second sound signal to generate a binaural sound signal (Step S48).

In this manner, the information processing device 100 according to the fourth embodiment specifies the IR 43 corresponding to the position where the user is located on the basis of the positional relationship information, and extracts from the specified IR 43 the partial component other than the component corresponding to the direct sound. Then, the information processing device 100 generates the binaural sound signal on the basis of the second sound signal generated from the extracted partial component. As a result, the information processing device 100 can provide the binaural sound signal corresponding to not only the user's orientation with respect to the sound source but also the position where the user is located, and can thus reproduce more highly accurate virtual representation.

5. Fifth Embodiment

Next, a fifth embodiment will be described with reference to FIG. 8. In the fifth embodiment, an example of generating a sound signal the direct sound of which the user may not be able to listen to from the sound source will be described. Note that, in a case where similar processing to those of the first to fourth embodiments is performed, the description thereof will be omitted.

Figure 8:
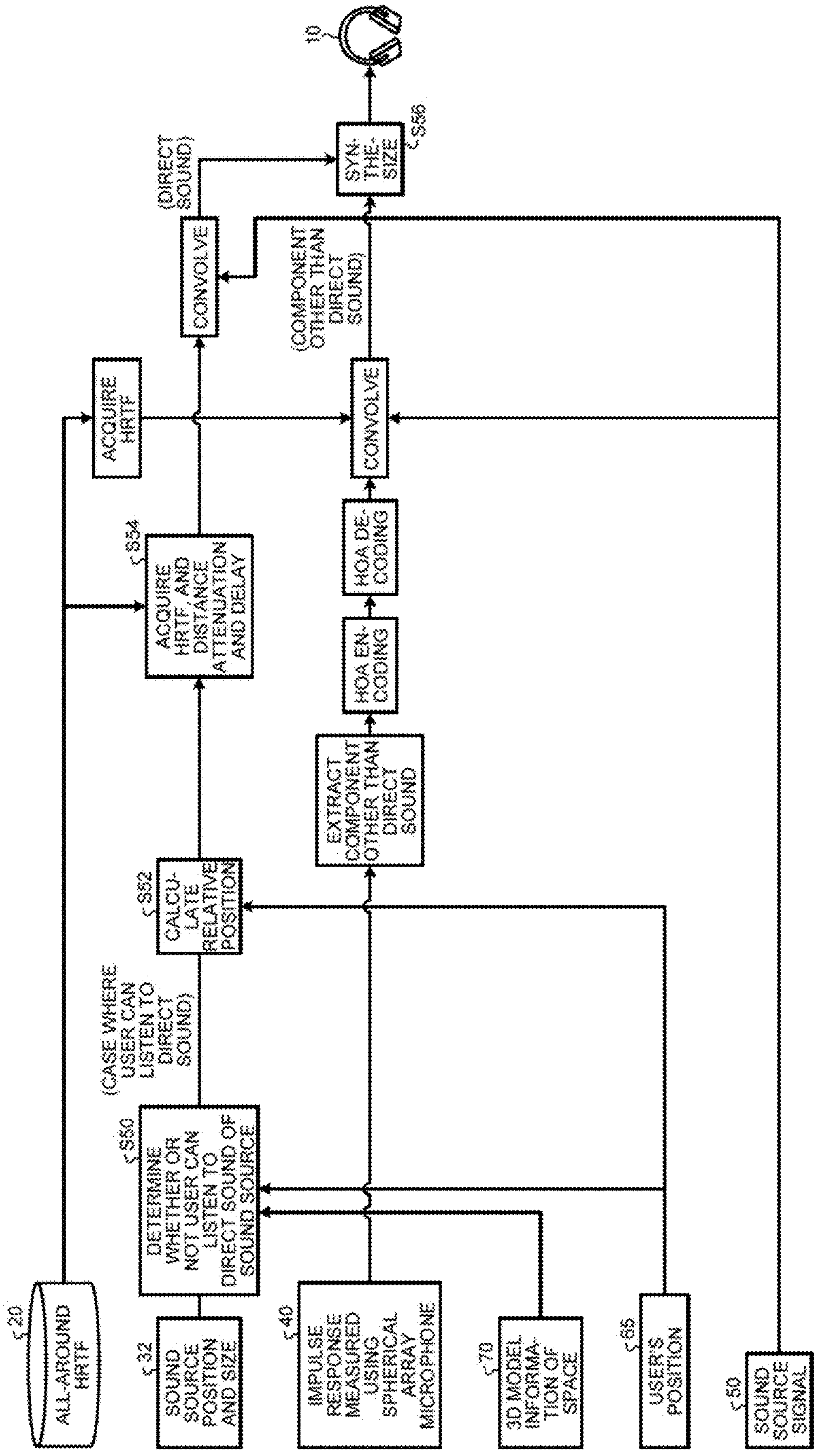
FIG. 8 is a conceptual diagram illustrating information processing according to a fifth embodiment.

FIG. 8 is a conceptual diagram illustrating information processing according to the fifth embodiment. As illustrated in FIG. 8, in the fifth embodiment, the information processing device 100 acquires 3D model information 70 of the space. For example, the information processing device 100 acquires the 3D model information 70 corresponding to the space in which the character operated by the user in content such as a game is located via a medium in which the content is recorded.

Furthermore, the information processing device 100 may acquire a size 32 of the sound source in addition to the sound source position. For example, the information processing device 100 acquires the size 32 of an object set as the sound source in the game content. The size 32 may include shape information of the sound source and the like. Note that, in a case where the information regarding the size such as the shape information of the sound source cannot be acquired, the information processing device 100 may execute the processing described below without using the information regarding the size. Furthermore, the information processing device 100 acquires the user's position 65.

Then, the information processing device 100 determines whether or not the user can listen to a direct sound of the sound source from a positional relationship between the sound source position and the size 32, and the user's position 65 in the 3D model information 70 of the space (Step S50). For example, in a case where it is estimated that the user cannot visually recognize the sound source for some reason, the information processing device 100 may determine that the user cannot listen to the direct sound of the sound source. As an example, the information processing device 100 may determine that the user cannot listen to the direct sound of the sound source in a case where there is a shielding object (an object or the like in the game content) between the user's position 65 and the sound source and the user cannot visually recognize the sound source.

In a case where it is determined in Step S50 that the user cannot listen to the direct sound of the sound source, the information processing device 100 does not perform convolution processing of the direct sound and does not generate a first sound signal corresponding to the direct sound. On the other hand, in a case where it is determined in Step S50 that the user can listen to the direct sound of the sound source, the information processing device 100 calculates a relative position between the user and the sound source as in the fourth embodiment (Step S52). Subsequently, after acquiring an HRTF corresponding to the relative position (Step S54), the information processing device 100 generates a first sound signal which is the direct sound component.

Furthermore, the information processing device 100 generates a second sound signal from a partial component other than the direct sound. Note that, although not illustrated, similarly to the third embodiment and the fourth embodiment, the information processing device 100 may generate the second sound signal after performing rotation or the like of the sound field in accordance with the user's position 65 or the like. Then, the information processing device 100 synthesizes the first sound signal with the second sound signal to generate a binaural sound signal to be reproduced by the reproduction device 10 (Step S56).

In this manner, the information processing device 100 determines whether or not the user can listen to the direct sound from the sound source on the basis of the positional relationship information, and in a case where it is determined that the user can listen to the direct sound from the sound source, convolves the HRTF corresponding to the sound source position of the sound source with the signal of the sound source, to generate the first sound signal. Furthermore, in a case where it is determined that the user cannot listen to the direct sound from the sound source, the information processing device 100 generates a binaural sound signal not including the direct sound component.

As a result, the information processing device 100 can virtually reproduce the user's situation in which the user cannot directly view the sound source with high accuracy. Note that the information processing device 100 can perform the processing according to the fifth embodiment in other cases than in the game content as long as the sound source position and the space information can be acquired. For example, in a case where the user uses AR glasses and the sound source is not viewed by a camera installed in the line-of-sight direction of the AR glasses, the information processing device 100 may determine that the user cannot listen to the direct sound from the sound source.

6. Sixth Embodiment

Next, a sixth embodiment will be described with reference to FIG. 9. In the sixth embodiment, an example in which a server 200 executes a part of the information processing of the present disclosure described in the first embodiment and the like will be described. Note that, in a case where similar processing to those of the first to fifth embodiments is performed, the description thereof will be omitted.

Figure 9:
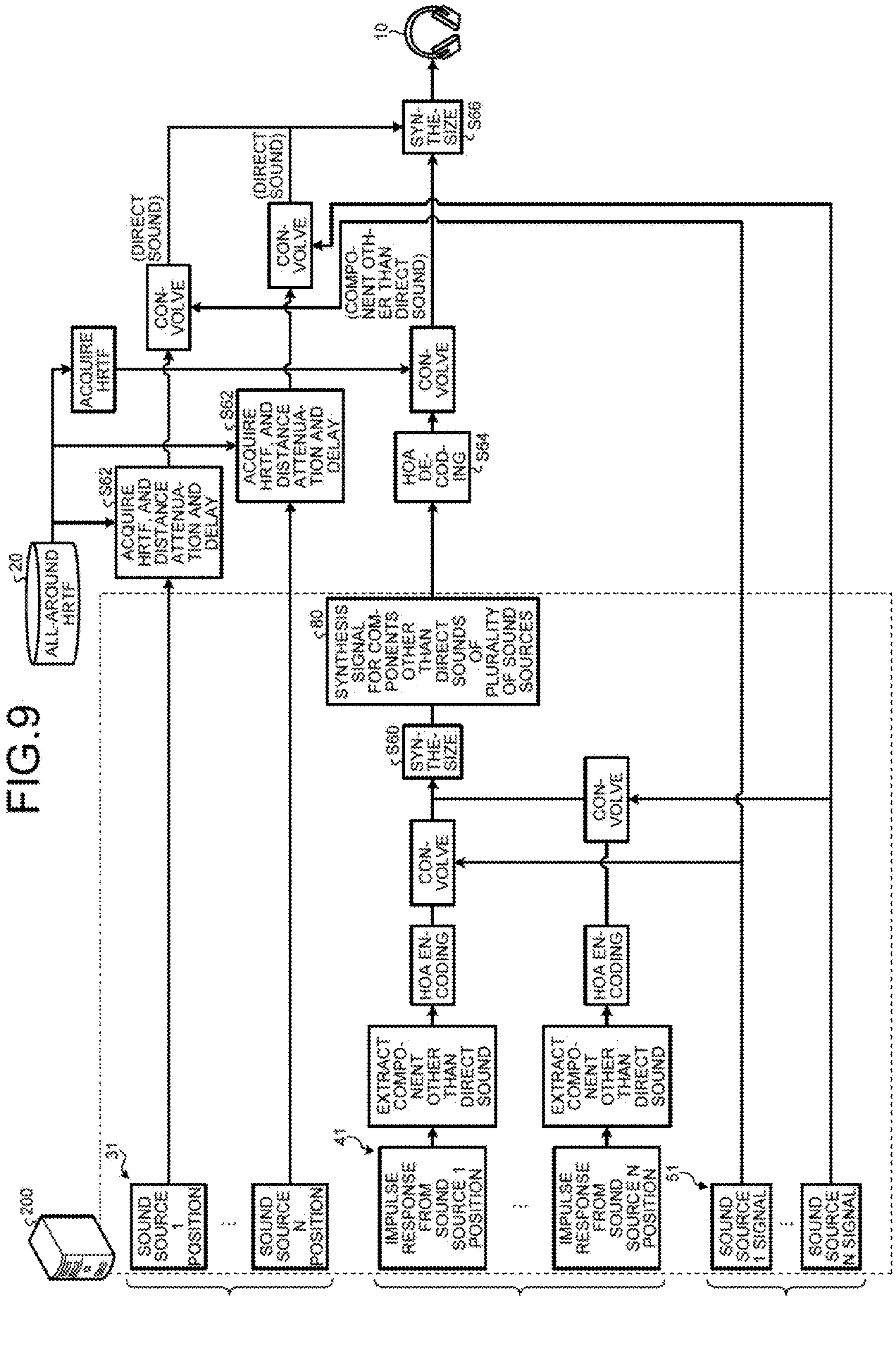
FIG. 9 is a conceptual diagram illustrating information processing according to a sixth embodiment.

FIG. 9 is a conceptual diagram illustrating information processing according to the sixth embodiment. As illustrated in FIG. 9, in the sixth embodiment, the server 200 acquires the plurality of sound source positions 31, the plurality of IRs 41, and the plurality of sound source signals 51, and executes information processing on the basis of the acquired information.

Specifically, similarly to the second embodiment, the server 200 extracts the components other than the direct sounds from the IRs corresponding to the plurality of sound sources, encodes the extracted components into the HOA signals, convolves and synthesizes the HOA signals with the respective sound source signals (Step S60). As a result, the server 200 generates a synthesis signal 80 for the components other than the direct sounds of the plurality of sound sources.

Thereafter, the server 200 distributes the plurality of sound source positions 31, the plurality of sound source signals 51, and the synthesis signal 80 for the components other than the direct sounds of the plurality of sound sources to the information processing device 100. As for each of the direct sounds, similarly to the second embodiment, the information processing device 100 calculates the HRTF and the positional relationship information corresponding to the sound source position (Steps S62 and S64), and generates a first sound signal.

Furthermore, the information processing device 100 HOA-decodes the synthesis signal 80 for the components other than the direct sounds of the plurality of sound sources acquired from the server 200 (Step S64), and convolves the decoded signal with the HRTF to generate a second sound signal. Then, the information processing device 100 synthesizes the first sound signal with the second sound signal to generate a binaural sound signal to be reproduced by the reproduction device 10 (Step S66).

In this manner, the information processing device 100 acquires the HOA signal generated by the external device such as the server 200, and generates the second sound signal on the basis of the acquired HOA signal. That is, the information processing device 100 can reduce the processing load of the device itself by acquiring the HOA signal for only the components other than the direct sounds of all the sound sources synthesized in advance by the server 200. Note that the information processing according to the sixth embodiment may be adjusted in various ways in accordance with the communication state between the server 200 and the information processing device 100, the data rate (information amount) of the sound signal to be processed, and the like. For example, in a case where the communication state with the information processing device 100 is relatively poor, the server 200 may perform lower-order encoding of the HOA signal. Alternatively, in a case where the communication state with the information processing device 100 is relatively poor, the server 200 may distribute only lower-order signals out of the higher-order encoded signals.

7. Seventh Embodiment

Next, a seventh embodiment will be described with reference to FIG. 10. In the seventh embodiment, an example in which the server 200 executes more kinds of processing than in the sixth embodiment will be described. Note that, in a case where similar processing to that of the sixth embodiment is performed, the description thereof will be omitted.

Figure 10:
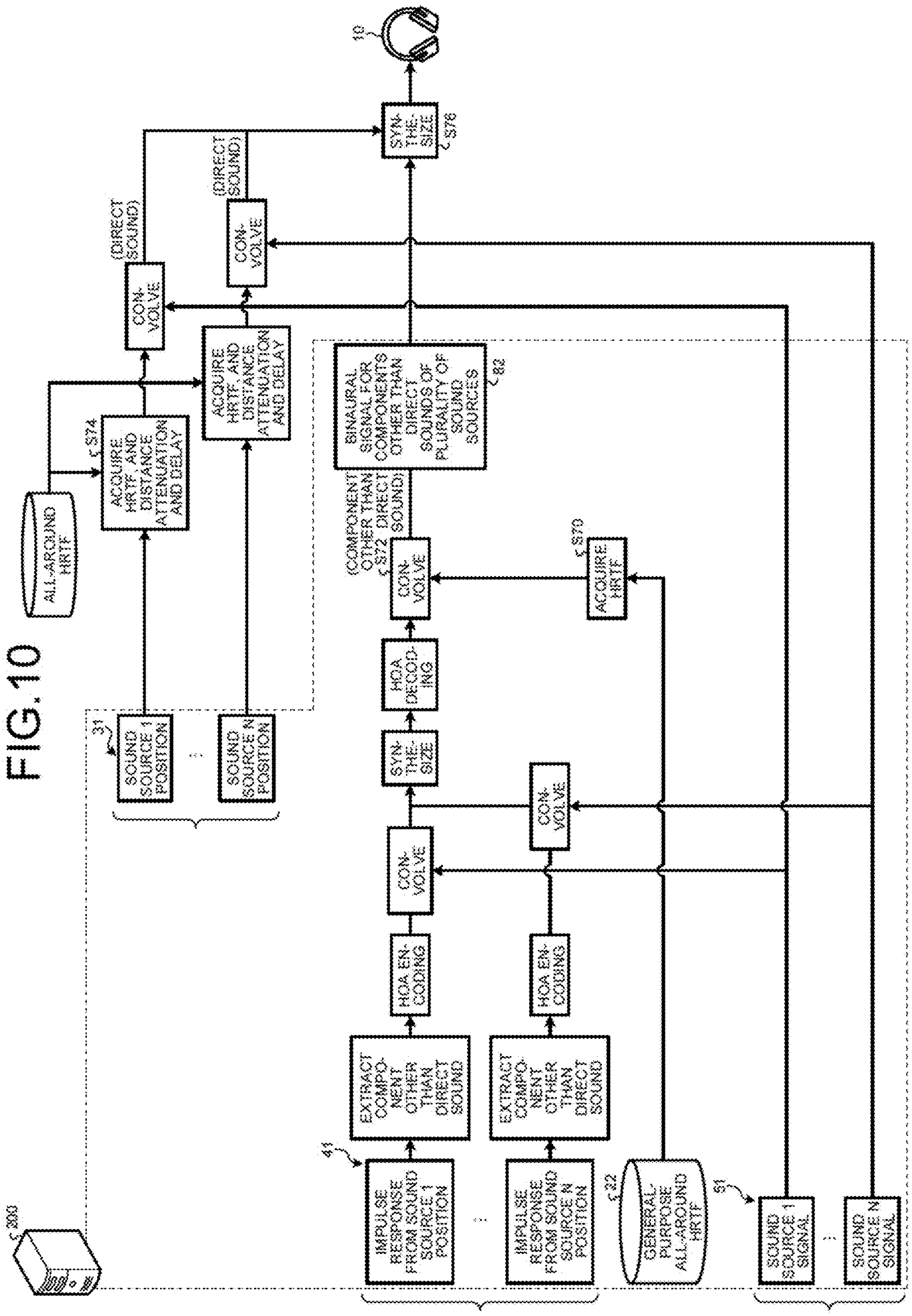
FIG. 10 is a conceptual diagram illustrating information processing according to a seventh embodiment.

FIG. 10 is a conceptual diagram illustrating information processing according to the seventh embodiment. As illustrated in FIG. 10, in the seventh embodiment, the server 200 holds a general-purpose all-around HRTF 22.

Similarly to the sixth embodiment, the server 200 extracts the components other than the direct sounds from the IRs corresponding to the plurality of sound sources, encodes the extracted components into the HOA signals, and convolves and synthesizes the HOA signals with the respective sound source signals. Thereafter, the server 200 acquires from the general-purpose all-around HRTF 22 an HRTF corresponding to a loudspeaker position (virtual loudspeaker position) in a case where the HOA signal is reproduced in a multichannel loudspeaker environment (Step S70), and convolves the acquired HRTF with the signal obtained by decoding the synthesized HOA signal (Step S72). As a result, the server 200 generates a binaural signal 82 for the components other than the direct sounds of the plurality of sound sources. The binaural signal 82 for the components other than the direct sounds of the plurality of sound sources is a signal equivalent to the second sound signal generated in the first to sixth embodiments, but is different from the second sound signal in that the general-purpose HRTF is convolved.

Thereafter, the server 200 distributes the plurality of sound source positions 31, the plurality of sound source signals 51, and the binaural signal 82 for the components other than the direct sounds of the plurality of sound sources to the information processing device 100. As for each of the direct sounds, similarly to the sixth embodiment, the information processing device 100 calculates the HRTF and the positional relationship information corresponding to the sound source position (Step S74), and generates a first sound signal.

Furthermore, the information processing device 100 synthesizes the first sound signal with the binaural signal 82 for the components other than the direct sounds of the plurality of sound sources to generate a binaural sound signal to be reproduced by the reproduction device 10 (Step S76).

In this manner, the information processing device 100 acquires a third sound signal (the binaural signal 82 for the components other than the direct sounds of the plurality of sound sources) generated by the server 200 convolving the HOA signal with the general-purpose HRTF (a freely-selected HRTF included in the general-purpose all-around HRTF 22). Then, the information processing device 100 synthesizes the first sound signal with the third sound signal to generate a binaural sound signal to be reproduced by the reproduction device 10.

That is, the information processing device 100 may acquire the sound signal including the components other than the direct sounds, generated in advance in the server 200. Since the general-purpose HRTF is used to generate the signal in the server 200, the reproducibility of the virtual representation may be inferior to that in the case of using the user's own HRTF. However, the signal generated in the server 200 includes the components other than the direct sounds, and an influence on the user's perception is limited. On the other hand, since the server 200 performs processing of generating the third sound signal, the processing load on the client (the information processing device 100) side is extremely reduced, so that the information processing device 100 can perform processing of generating and reproducing the binaural sound signal at a higher speed and with a lower load.

Here, the configuration of the server 200 according to the sixth embodiment and the seventh embodiment will be described with reference to FIG. 11.

Figure 11:
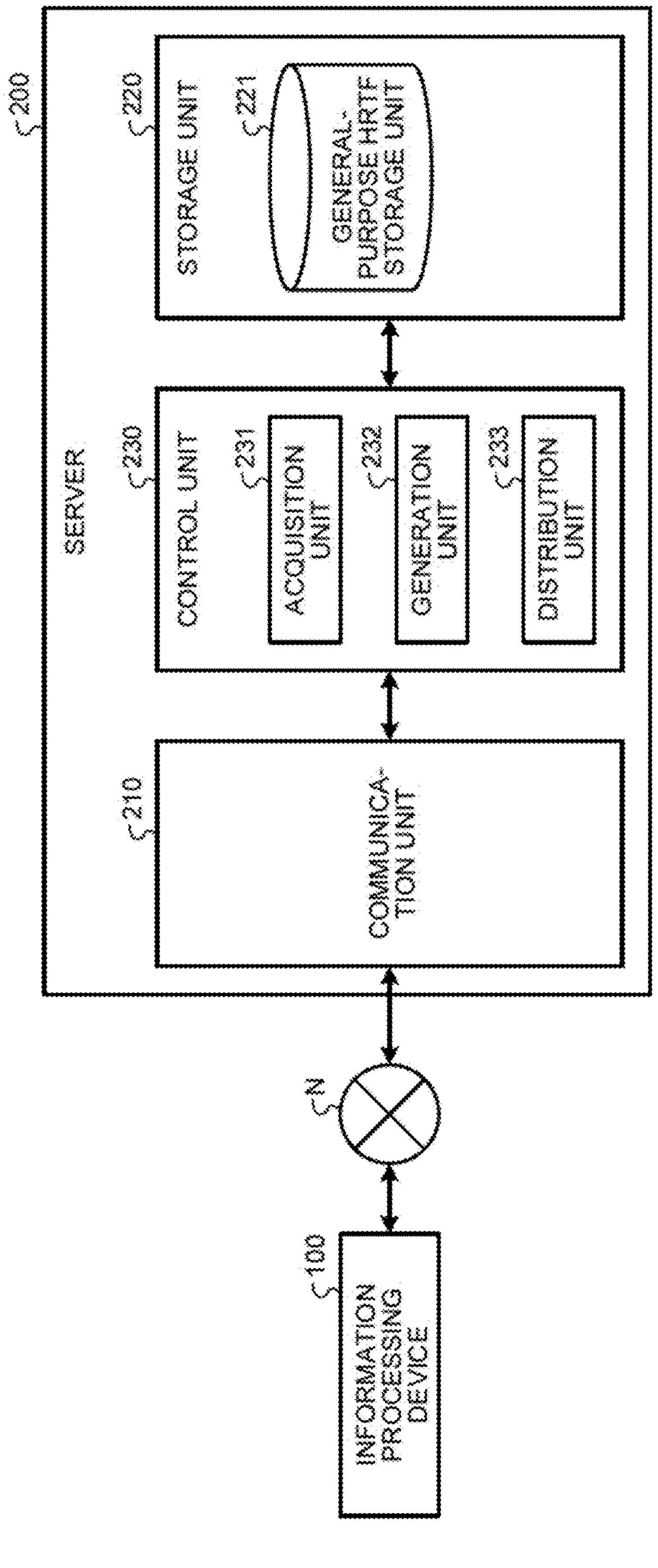
FIG. 11 is a diagram illustrating a configuration example of a server according to the sixth embodiment and the seventh embodiment.

FIG. 11 is a diagram illustrating a configuration example of the server 200 according to the sixth embodiment and the seventh embodiment.

As illustrated in FIG. 11, the server 200 includes a communication unit 210, a storage unit 220, and a control unit 230. Note that the server 200 may include an input unit (for example, a keyboard) that receives various operations from an administrator or the like who operates the server 200, and a display unit (for example, a liquid crystal display) for displaying various types of information.

The function of the communication unit 210 is fulfilled by, for example, an NIC. The communication unit 210 is connected to the network N in a wired or wireless manner, and transmits and receives information to and from the information processing device 100 and the like via the network N.

The function of the storage unit 220 is fulfilled by, for example, a semiconductor memory element such as a RAM and a flash memory, or a storage device such as a hard disk and an optical disk. As illustrated in FIG. 11, the storage unit 220 includes a general-purpose HRTF storage unit 221. Note that, although not illustrated, the storage unit 220 may store various data other than the HRTF used for information processing, the sound source signal 50 serving as the source of the sound reproduced by the reproduction device 10, and the like.

The general-purpose HRTF storage unit 221 stores a general-purpose HRIF the user of which is not specified out of the HRTFs used for binaural reproduction. For example, the general-purpose HRTF storage unit 221 stores an HRTF usable for general purposes such as an average value of HRTFs derived from a plurality of users and an HRTF derived from the head of the dummy doll by acoustic simulation.

The function of the control unit 230 is fulfilled, for example, by a CPU, an MPU, or the like executing a program stored in the server 200 using a RAM or the like as a working area. Also, the control unit 230 may be a controller, and the function thereof may be fulfilled by an integrated circuit such as an ASIC and an FPGA.

As illustrated in FIG. 11, the control unit 230 includes an acquisition unit 231, a generation unit 232, and a distribution unit 233, and fulfills or executes a function or an action of information processing described below. Note that the internal configuration of the control unit 230 is not limited to the configuration illustrated in FIG. 11, and may be another configuration that performs information processing described below.

The acquisition unit 231 acquires various types of information. For example, the acquisition unit 231 acquires the general-purpose HRTF. The acquisition unit 231 also acquires the IR 40 that is information indicating the acoustic characteristic in the reproduction environment. The acquisition unit 231 stores the acquired information in the storage unit 220.

The generation unit 232 executes processing equivalent to processing of the first generation unit 132 and the second generation unit 133 in the information processing device 100.

The distribution unit 233 distributes data and a sound signal generated by the generation unit 232 to the information processing device 100. For example, the distribution unit 233 distributes the synthesis signal 80 for the components other than the direct sounds of the plurality of sound sources and the binaural signal 82 for the components other than the direct sounds of the plurality of sound sources to the information processing device 100.

8. Eighth Embodiment

Next, an eighth embodiment will be described with reference to FIG. 12. In the eighth embodiment, an example in which the information processing device 100 does not use for reproduction an acoustic characteristic (impulse response or the like) of an indoor environment measured in advance but reproduces recorded content itself will be described. Note that, in a case where similar processing to those of the first to seventh embodiments is performed, the description thereof will be omitted. A situation assumed in the eighth embodiment is, for example, a situation in which a spherical array microphone is installed at any one point of a concert hall, and content (such as performance of an orchestra) measured by the microphone is virtually reproduced by the reproduction device 10. The content measured by the spherical array microphone can be said to be information indicating the acoustic characteristic in the reproduction environment since the spherical array microphone records not only the sound itself but also the reverberation component in the room.

Figure 12:
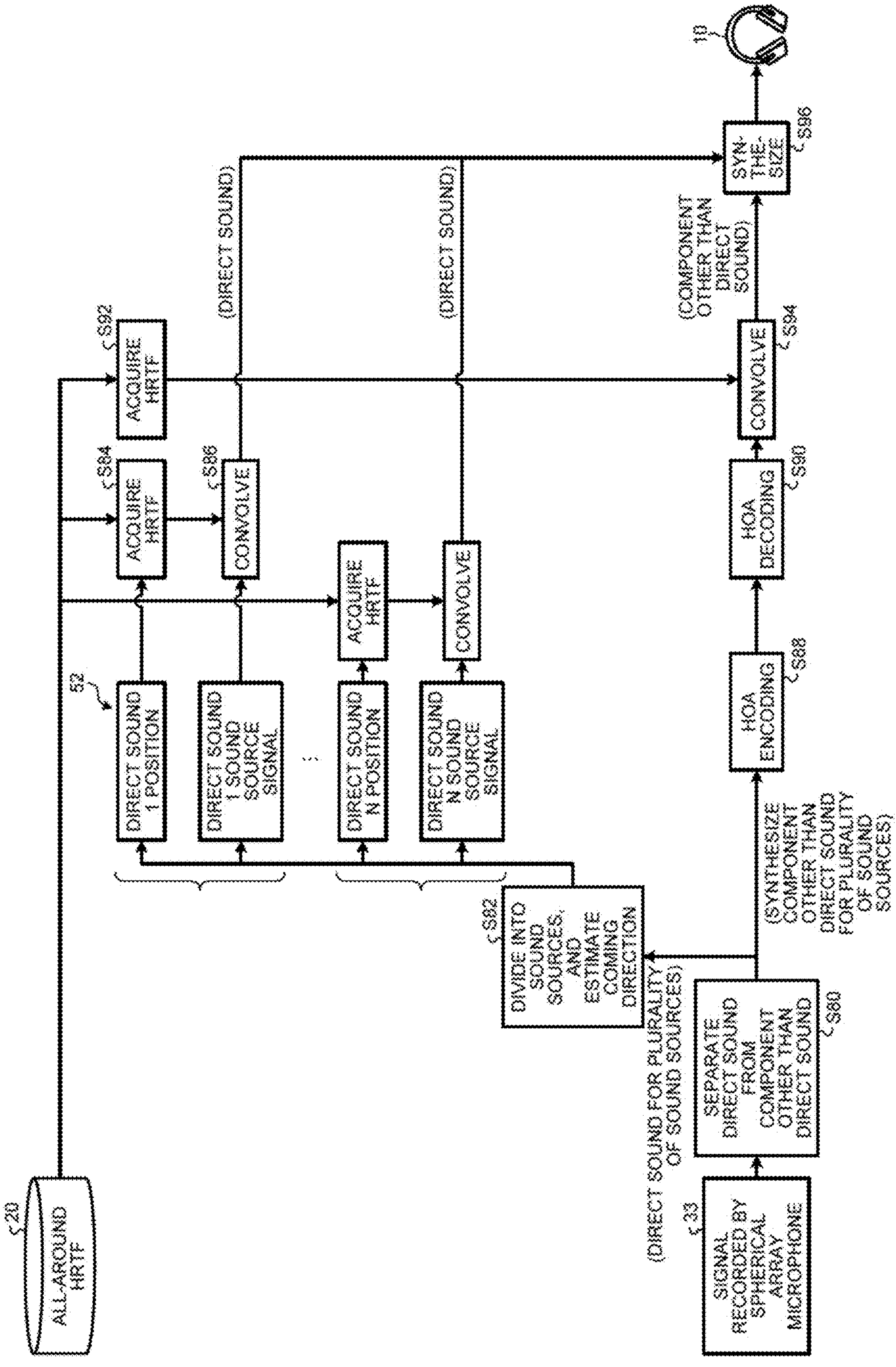
FIG. 12 is a conceptual diagram illustrating information processing according to an eighth embodiment.

FIG. 12 is a conceptual diagram illustrating information processing according to the eighth embodiment. As illustrated in FIG. 12, in the eighth embodiment, the information processing device 100 generates a binaural sound signal on the basis of a signal 33 measured by a spherical array microphone.

First, the information processing device 100 acquires the signal 33 measured by the spherical array microphone, and separates the acquired signal 33 into a direct sound and a component other than the direct sound (Step S80). For example, the information processing device 100 performs de-reverb processing on the signal 33 and removes the reverberation component, thereby separating the direct sound from the component other than the direct sound.

Then, the information processing device 100 executes processing of dividing the direct sound component into sound sources (Step S82). As an example, the information processing device 100 divides the direct sound component into sound sources corresponding to instruments on the basis of information such as frequency, sound pressure, and intensity of directivity included in each signal. Furthermore, for each divided sound source, the information processing device 100 executes processing of estimating a direction in which the sound comes from the sound source toward the listener. The information processing device 100 may estimate the position of the sound source from a difference in arrival time among the sound sources measured by the array microphone or the like, or may assign a certain object to each sound source and appropriately set the position of the object, on the basis of known technologies.

Thereafter, for a combination 52 of the position and the signal of each sound source of the direct sound, the information processing device 100 acquires an HRTF corresponding to the position (Step S84), and convolves the HRTF with the signal (Step S86). As a result, the information processing device 100 generates a first sound signal corresponding to the direct sound component.

Furthermore, the information processing device 100 performs HOA encoding (Step S88) and HOA decoding (Step S90) on the component other than the direct sound, acquires an HRTF corresponding to a virtual loudspeaker position (Step S92), and convolves the HRTF with the component other than the direct sound (Step S94). As a result, the information processing device 100 generates a second sound signal corresponding to the component other than the direct sound. The information processing device 100 synthesizes the first sound signal with the second sound signal to generate a binaural sound signal (Step S96).

In this manner, the information processing device 100 may separate, as the information indicating the acoustic characteristic in the reproduction environment, the reflection or reverberation component other than the sound signal corresponding to the direct sound from the plurality of sound signals simultaneously recorded by the plurality of microphones (spherical array microphone or the like) in the reproduction environment, and generate the HOA signal on the basis of the separated reflection or reverberation component. Furthermore, the information processing device 100 may generate the first sound signal on the basis of the separated direct sound and the HRTF corresponding to the sound source position of the direct sound.

That is, even in a case where the impulse response in the room cannot be acquired, the information processing device 100 can execute the information processing according to the present disclosure if the content measured in the indoor environment can be acquired. As a result, the information processing device 100 can reproduce highly accurate virtual representation for content obtained under various situations.

Note that, in Step S80, the information processing device 100 may separate the direct sound from the component other than the direct sound on the basis of the intensity of the directivity of the sound source included in the content. For example, in a case of instruments constituting an orchestra, in general, a wind instrument has sharp and clear directivity, and a string instrument has gentle and ambiguous directivity. In this case, the information processing device 100 may regard a sound source corresponding to a wind instrument as a direct sound, and may regard a sound source corresponding to a string instrument as a component other than the direct sound.

9. Ninth Embodiment

Next, a ninth embodiment will be described with reference to FIG. 13. In the ninth embodiment, an example in which the information processing device 100 executes the information processing according to the present disclosure using data (hereinbelow referred to as “dry source”) measured in a state where the sound sources are separated from one another will be described. Note that, in a case where similar processing to those of the first to eighth embodiments is performed, the description thereof will be omitted. A situation assumed in the ninth embodiment is a situation in which, in addition to the spherical array microphone, a dedicated microphone to each part of an orchestra is installed, and a binaural sound signal is generated on the basis of a sound source measured by each microphone.

Figure 13:
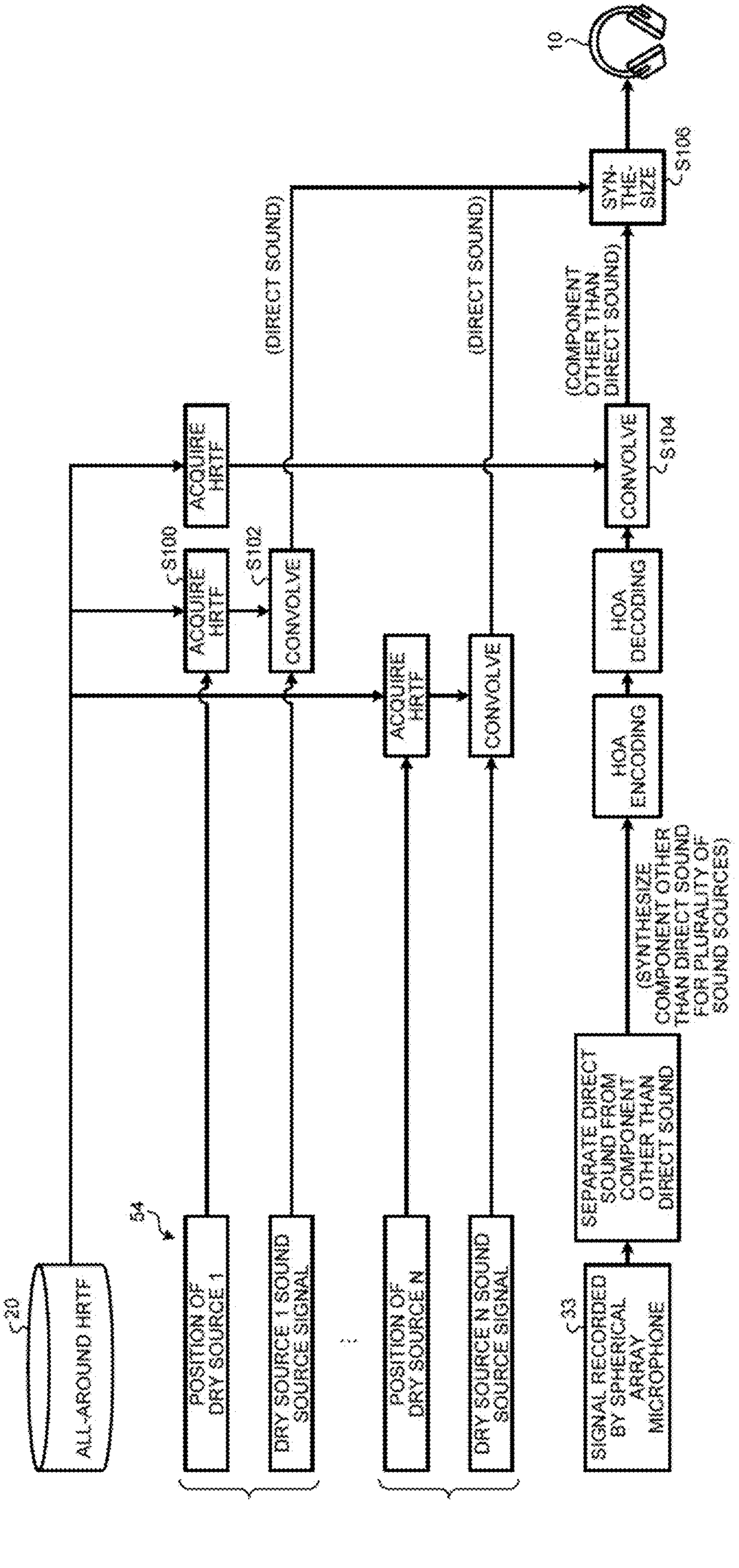
FIG. 13 is a conceptual diagram illustrating information processing according to a ninth embodiment.

FIG. 13 is a conceptual diagram illustrating information processing according to the ninth embodiment. As illustrated in FIG. 13, in the ninth embodiment, the information processing device 100 generates a binaural sound signal on the basis of a combination 54 of a position of a dry source and a sound source signal as well as the signal 33 recorded by the spherical array microphone.

In the ninth embodiment, the combination 54 of the position of the dry source and the source signal corresponds to a direct sound component. That is, for the combination 54 of the position and the sound source signal of the dry source, the information processing device 100 acquires an HRTF corresponding to the position (Step S100), and convolves the HRTF with the sound source signal (Step S102). As a result, the information processing device 100 generates a first sound signal corresponding to the direct sound component.

Furthermore, the information processing device 100 separates the signal 33 measured by the spherical array microphone into a direct sound and a component other than the direct sound as in the eighth embodiment. Then, the information processing device 100 performs HOA encoding and HOA decoding on the component other than the direct sound, acquires an HRTF corresponding to a virtual loudspeaker position, and convolves the HRTF with the component other than the direct sound (Step S104). As a result, the information processing device 100 generates a second sound signal corresponding to the component other than the direct sound. The information processing device 100 synthesizes the first sound signal with the second sound signal to generate a binaural sound signal (Step S106).

In this manner, the information processing device 100 generates the first sound signal on the basis of the sound signal (dry source) recorded by a measurement means different from the spherical array microphone and installed in the vicinity of a measurement target (an example of the measurement means is a microphone installed in the immediate vicinity of the instrument) and the HRTF corresponding to the installation position of the measurement means.

That is, the information processing device 100 can also execute the information processing according to the present disclosure for content obtained by recording a dry source. As a result, the information processing device 100 can reproduce highly accurate virtual representation for content obtained under various situations.

10. Other Embodiments

The processing according to each of the embodiments described above may be performed in various different modes other than the embodiments described above.

In the above embodiment, an example has been described in which the information processing device 100 generates the binaural sound signal to be reproduced by the reproduction device 10. However, the information processing device 100 and the reproduction device 10 may be integrated. In this case, the information processing device 100 includes a sound output unit (for example, a loudspeaker and a terminal that outputs sound to a headphone or the like) included in the reproduction device 10. Furthermore, the information processing device 100 and the reproduction device 10 may cooperate to perform the information processing according to the present disclosure. For example, part of the processing executed by the information processing device 100 described in the embodiments may be executed by the reproduction device 10.

Also, among the pieces of processing described in each of the above embodiments, all or a part of the pieces of processing described as being performed automatically can be performed manually, or all or a part of the pieces of processing described as being performed manually can be performed automatically by a known method. In addition, the processing procedures, specific names, and information including various data and parameters illustrated in the specification and drawings can freely be changed unless otherwise specified. For example, the various types of information illustrated in each of the drawings are not limited to the illustrated information.

Also, each of the components of each of the devices illustrated in the drawings is functionally conceptual, and is not necessarily physically provided as illustrated in the drawings. That is, a specific form of distribution and integration of the devices is not limited to the illustrated form, and all or a part thereof can functionally or physically be distributed and integrated in any unit according to various loads, usage conditions, and the like.

Also, the above-described embodiments and modification examples can appropriately be combined in a range in which the processing contents do not contradict each other.

Also, the effects described in the present specification are illustrative only and are not limited, and other effects may be provided.

11. Effects of Information Processing Device According to Present Disclosure

As described above, an information processing device (the information processing device 100 in the embodiments) according to the present disclosure includes a first generation unit (the first generation unit 132 in the embodiments), a second generation unit (the second generation unit 133 in the embodiments), and a third generation unit (the third generation unit 134 in the embodiments). The first generation unit generates a first sound signal on a basis of positional relationship information indicating a relationship between a listener and a sound source position and a head-related transfer function (HRTF) corresponding to the sound source position. The second generation unit generates a second sound signal on a basis of ambisonics format data (the HOA signal in the embodiments) generated from a partial component out of information indicating an acoustic characteristic in a reproduction environment. The third generation unit generates a reproduction signal (the binaural sound signal to be reproduced by the reproduction device 10 in the embodiments) by synthesizing the first sound signal with the second sound signal.

In this manner, the information processing device according to the present disclosure generates the binaural sound signal by synthesizing the component processed using the HRTF with the component processed using the HOA signal. As a result, the information processing device 100 can provide a binaural sound signal that does not make the user feel strange while achieving the sound field expression using the HOA without requiring time and effort to measure the BRIR at all measurement points in the room. That is, the information processing device 100 can generate a binaural sound signal capable of highly accurate virtual representation.

Furthermore, the second generation unit extracts a partial component of an impulse response (the IR 40 or the like in the embodiments) in the reproduction environment as the information indicating the acoustic characteristic in the reproduction environment, and generates the ambisonics format data on a basis of the extracted partial component.

In this manner, by extracting the partial component on the basis of the impulse response, the information processing device can recognize the component to be separated on the time axis and then accurately separate the component.

Furthermore, the second generation unit extracts a partial component of the impulse response other than a component corresponding to a direct sound, and generates the ambisonics format data on a basis of the extracted partial component.

In this manner, by extract the partial component on the basis of the impulse response, the information processing device can accurately separate the direct sound from the reflected sound component.

Furthermore, the second generation unit extracts partial components of impulse responses each corresponding to a plurality of sound sources other than components corresponding to direct sounds, generates a plurality of pieces of ambisonics format data each corresponding to the plurality of sound sources on a basis of the extracted partial components, and convolves data obtained by synthesizing the plurality of pieces of ambisonics format data, which have been generated, with data obtained by subjecting the head-related transfer function to spherical harmonics expansion to generate the second sound signal.

In this manner, by separating each of the plurality of sound sources into the direct sound and the component other than the direct sound, the information processing device can generate a highly accurate binaural sound signal regardless of the number of sound source signals.

Furthermore, the second generation unit generates the second sound signal from data obtained by rotating the ambisonics format data in an orientation of the listener on a basis of the positional relationship information.

In this manner, by employing the processing method based on the sound field such as a method using ambisonics format data, the information processing device can generate a binaural sound signal excellent in virtual representation.

Furthermore, the second generation unit specifies an impulse response corresponding to a position where the listener is located on a basis of the positional relationship information, and extracts from the specified impulse response the partial component other than the component corresponding to the direct sound.

In this manner, by using the impulse response corresponding to the position of the listener for processing, the information processing device can generate a binaural sound signal that makes the listener feel immersed in the virtual space to be reproduced as if he/she is actually located at the position.

Furthermore, the first generation unit determines whether or not the listener can listen to the direct sound from the sound source on a basis of the positional relationship information, and in a case where it is determined that the listener can listen to the direct sound from the sound source, convolve the head-related transfer function corresponding to the sound source position of the sound source with a signal of the sound source, to generate the first sound signal.

In this manner, by determining whether or not the listener can recognize the sound source in the virtual space, and performing the sound generation processing on the basis of the determination result, the information processing device can generate a binaural sound signal further providing a sense of reality.

The information processing device further includes an acquisition unit (the acquisition unit 131 in the embodiments) that acquires the ambisonics format data generated by an external device (the server 200 in the embodiments). The second generation unit generates the second sound signal on a basis of the ambisonics format data acquired by the acquisition unit.

In this manner, the information processing device may generate the binaural sound signal using the ambisonics format data distributed from the external device. As a result, the information processing device can reduce the processing load.

Furthermore, the acquisition unit acquires a third sound signal (the binaural signal 82 for the components other than the direct sounds of the plurality of sound sources in the embodiments) generated by convolving the ambisonics format data with a freely-selected head-related transfer function. The third generation unit synthesizes the first sound signal with the third sound signal to generate the reproduction signal.

In this manner, the information processing device may generate the binaural sound signal using the third sound signal distributed from the external device. As a result, the information processing device can further reduce the processing load and execute high-speed generation processing.

Furthermore, the second generation unit separates, as the information indicating the acoustic characteristic in the reproduction environment, a reflection or reverberation component other than a sound signal corresponding to a direct sound from a plurality of sound signals simultaneously recorded by a plurality of microphones in the reproduction environment, and generates the ambisonics format data on a basis of the separated reflection or reverberation component.

In this manner, the information processing device can execute the processing according to the present disclosure on the basis of the recorded sound signal without using the impulse response as the indoor acoustic characteristic. That is, the information processing device can reproduce highly accurate virtual representation for content obtained under various situations.

Furthermore, the first generation unit generates the first sound signal on a basis of the direct sound separated by the second generation unit and a head-related transfer function corresponding to a sound source position of the direct sound.

In this manner, the information processing device can generate the first sound signal by sound source separation (for example, de-reverb processing) without performing analysis of the impulse response, and can thus reproduce highly accurate virtual representation under various situations.

Furthermore, the first generation unit generates the first sound signal on a basis of a sound signal (the combination 54 of the position of the dry source and the source signal in the embodiments) recorded by a measurement means different from the plurality of microphones and installed in a vicinity of a measurement target and a head-related transfer function corresponding to an installation position of the measurement means.

In this manner, the information processing device according to the present disclosure can reproduce highly accurate virtual representation for various types of content such as a sound source signal including a dry source.

12. Hardware Configuration

Figure 14:
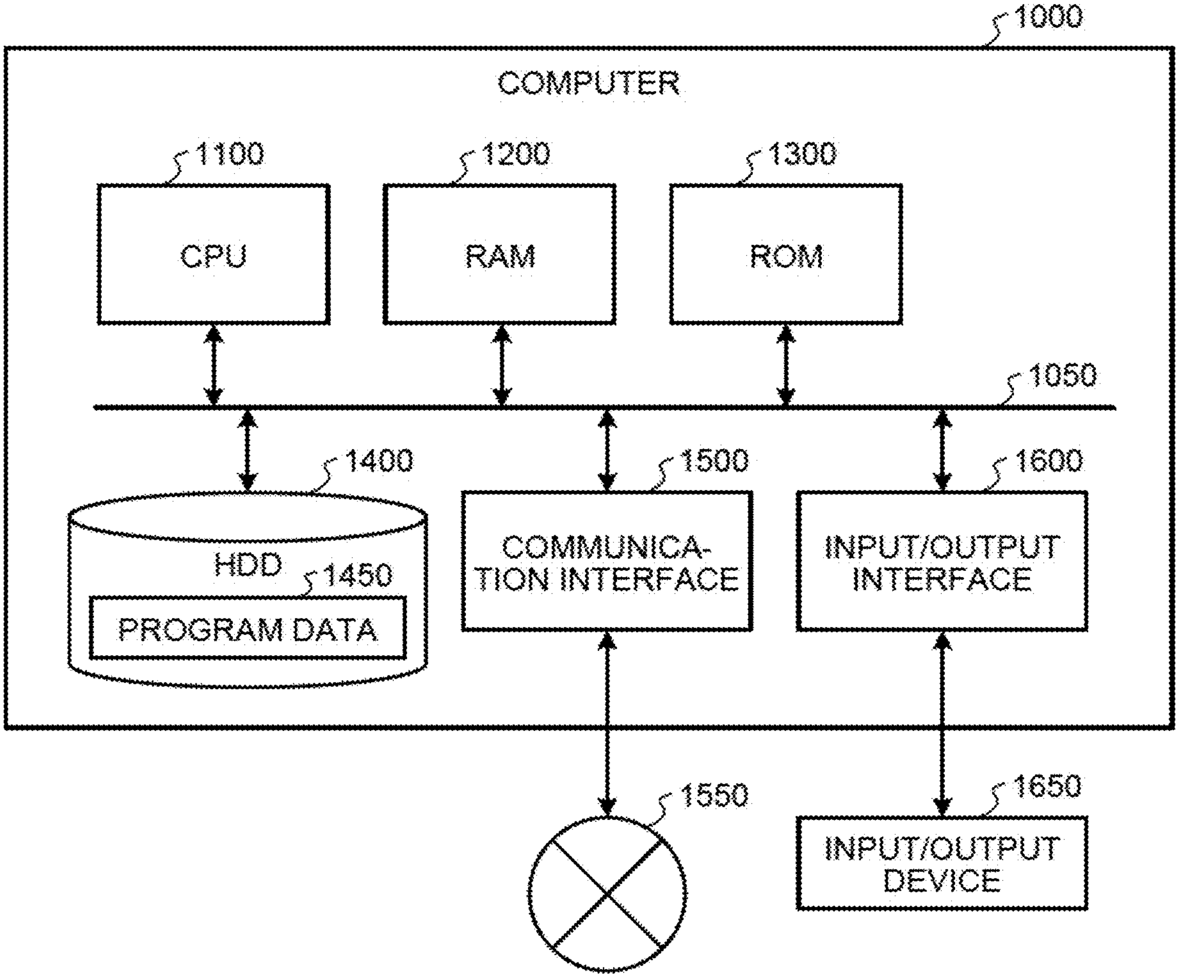
FIG. 14 is a hardware configuration diagram illustrating an example of a computer that fulfills a function of the information processing device.

The information device such as the information processing device 100 and the server 200 according to each of the embodiments described above is achieved by a computer 1000 having a configuration as illustrated in FIG. 14, for example. Hereinbelow, the information processing device 100 according to the first embodiment will be described as an example. FIG. 14 is a hardware configuration diagram illustrating an example of the computer 1000 that fulfills the function of the information processing device 100. The computer 1000 includes a CPU 1100, a RAM 1200, a read only memory (ROM) 1300, a hard disk drive (HDD) 1400, a communication interface 1500, and an input/output interface 1600. The respective units of the computer 1000 are connected by a bus 1050.

The CPU 1100 operates on the basis of a program stored in the ROM 1300 or the HDD 1400, and controls each unit. For example, the CPU 1100 loads a program stored in the ROM 1300 or the HDD 1400 into the RAM 1200, and executes processing corresponding to each of various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records the information processing program according to the present disclosure as an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 to the computer 1000. For example, the CPU 1100 receives data from an input device such as a keyboard and a mouse via the input/output interface 1600. In addition, the CPU 1100 transmits data to an output device such as a display, a loudspeaker, and a printer via the input/output interface 1600. Furthermore, the input/output interface 1600 may function as a media interface that reads a program or the like recorded in a predetermined recording medium. The medium is, for example, an optical recording medium such as a digital versatile disc (DVD) and a phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing device 100 according to the first embodiment, the CPU 1100 of the computer 1000 fulfills the function of the control unit 130 and the like by executing the information processing program loaded on the RAM 1200. In addition, the HDD 1400 stores the information processing program according to the present disclosure and data in the storage unit 120. Note that the CPU 1100 reads the program data 1450 from the HDD 1400 and executes the program, but as another example, the CPU 1100 may acquire such a program from another device via the external network 1550.

Note that the present technology can also employ the following configuration.

(1) An information processing device comprising:

a first generation unit that generates a first sound signal on a basis of positional relationship information indicating a relationship between a listener and a sound source position and a head-related transfer function corresponding to the sound source position;

a second generation unit that generates a second sound signal on a basis of ambisonics format data generated from a partial component out of information indicating an acoustic characteristic in a reproduction environment; and a third generation unit that generates a reproduction signal by synthesizing the first sound signal with the second sound signal.

(2) The information processing device according to (1), wherein the second generation unit extracts a partial component of an impulse response in the reproduction environment as the information indicating the acoustic characteristic in the reproduction environment, and generates the ambisonics format data on a basis of the extracted partial component.

(3) The information processing device according to (2), wherein the second generation unit extracts a partial component of the impulse response other than a component corresponding to a direct sound, and generates the ambisonics format data on a basis of the extracted partial component.

(4) The information processing device according to (3), wherein the second generation unit extracts partial components of impulse responses each corresponding to a plurality of sound sources other than components corresponding to direct sounds, generates a plurality of pieces of ambisonics format data each corresponding to the plurality of sound sources on a basis of the extracted partial components, and convolves data obtained by synthesizing the plurality of pieces of ambisonics format data, which have been generated, with data obtained by subjecting the head-related transfer function to spherical harmonics expansion to generate the second sound signal.

(5) The information processing device according to (3) or (4), wherein the second generation unit generates the second sound signal from data obtained by rotating the ambisonics format data in an orientation of the listener on a basis of the positional relationship information.

(6) The information processing device according to any one of (3) to (5), wherein the second generation unit specifies an impulse response corresponding to a position where the listener is located on a basis of the positional relationship information, and extracts from the specified impulse response the partial component other than the component corresponding to the direct sound.

(7) The information processing device according to any one of (3) to (6), wherein the first generation unit determines whether or not the listener can listen to the direct sound from the sound source on a basis of the positional relationship information, and in a case where it is determined that the listener can listen to the direct sound from the sound source, convolve the head-related transfer function corresponding to the sound source position of the sound source with a signal of the sound source, to generate the first sound signal.

(8) The information processing device according to any one of (1) to (7), further comprising:

an acquisition unit that acquires the ambisonics format data generated by an external device, wherein the second generation unit generates the second sound signal on a basis of the ambisonics format data acquired by the acquisition unit.

(9) The information processing device according to (8), wherein the acquisition unit acquires a third sound signal generated by convolving the ambisonics format data with a freely-selected head-related transfer function, and the third generation unit synthesizes the first sound signal with the third sound signal to generate the reproduction signal.

(10) The information processing device according to any one of (1) to (9), wherein the second generation unit separates, as the information indicating the acoustic characteristic in the reproduction environment, a reflection or reverberation component other than a sound signal corresponding to a direct sound from a plurality of sound signals simultaneously recorded by a plurality of microphones in the reproduction environment, and generates the ambisonics format data on a basis of the separated reflection or reverberation component.

(11) The information processing device according to (10), wherein the first generation unit generates the first sound signal on a basis of the direct sound separated by the second generation unit and a head-related transfer function corresponding to a sound source position of the direct sound.

(12) The information processing device according to (10) or (11), wherein the first generation unit generates the first sound signal on a basis of a sound signal recorded by a measurement means different from the plurality of microphones and installed in a vicinity of a measurement target and a head-related transfer function corresponding to an installation position of the measurement means.

(13) An information processing method comprising:

by a computer generating a first sound signal on a basis of positional relationship information indicating a relationship between a listener and a sound source position and a head-related transfer function corresponding to the sound source position;

generating a second sound signal on a basis of ambisonics format data generated from a partial component out of information indicating an acoustic characteristic in a reproduction environment; and generating a reproduction signal by synthesizing the first sound signal with the second sound signal.

(14) An information processing program for causing a computer to function as:

a first generation unit that generates a first sound signal on a basis of positional relationship information indicating a relationship between a listener and a sound source position and a head-related transfer function corresponding to the sound source position;

a second generation unit that generates a second sound signal on a basis of ambisonics format data generated from a partial component out of information indicating an acoustic characteristic in a reproduction environment; and a third generation unit that generates a reproduction signal by synthesizing the first sound signal with the second sound signal.

REFERENCE SIGNS LIST

10 REPRODUCTION DEVICE
100 INFORMATION PROCESSING DEVICE
110 COMMUNICATION UNIT
120 STORAGE UNIT
121 HRTF STORAGE UNIT
130 CONTROL UNIT
131 ACQUISITION UNIT
132 FIRST GENERATION UNIT
133 SECOND GENERATION UNIT
134 THIRD GENERATION UNIT
135 REPRODUCTION UNIT
200 SERVER

The invention claimed is:

1. An information processing device comprising:

a first generation unit that generates a first sound signal on a basis of positional relationship information indicating a relationship between a listener and a sound source position and a head-related transfer function corresponding to the sound source position;

a second generation unit that generates a second sound signal on a basis of ambisonics format data generated from a partial component out of information indicating an acoustic characteristic in a reproduction environment; and a third generation unit that generates a reproduction signal by synthesizing the first sound signal with the second sound signal.

2. The information processing device according to claim 1, wherein the second generation unit extracts a partial component of an impulse response in the reproduction environment as the information indicating the acoustic characteristic in the reproduction environment, and generates the ambisonics format data on a basis of the extracted partial component.

3. The information processing device according to claim 2, wherein the second generation unit extracts a partial component of the impulse response other than a component corresponding to a direct sound, and generates the ambisonics format data on a basis of the extracted partial component.

4. The information processing device according to claim 3, wherein the second generation unit extracts partial components of impulse responses each corresponding to a plurality of sound sources other than components corresponding to direct sounds, generates a plurality of pieces of ambisonics format data each corresponding to the plurality of sound sources on a basis of the extracted partial components, and convolves data obtained by synthesizing the plurality of pieces of ambisonics format data, which have been generated, with data obtained by subjecting the head-related transfer function to spherical harmonics expansion to generate the second sound signal.

5. The information processing device according to claim 3, wherein the second generation unit generates the second sound signal from data obtained by rotating the ambisonics format data in an orientation of the listener on a basis of the positional relationship information.

6. The information processing device according to claim 3, wherein the second generation unit specifies an impulse response corresponding to a position where the listener is located on a basis of the positional relationship information, and extracts from the specified impulse response the partial component other than the component corresponding to the direct sound.

7. The information processing device according to claim 3, wherein the first generation unit determines whether or not the listener can listen to the direct sound from the sound source on a basis of the positional relationship information, and in a case where it is determined that the listener can listen to the direct sound from the sound source, convolve the head-related transfer function corresponding to the sound source position of the sound source with a signal of the sound source, to generate the first sound signal.

8. The information processing device according to claim 1, further comprising:

an acquisition unit that acquires the ambisonics format data generated by an external device, wherein the second generation unit generates the second sound signal on a basis of the ambisonics format data acquired by the acquisition unit.

9. The information processing device according to claim 8, wherein the acquisition unit acquires a third sound signal generated by convolving the ambisonics format data with a freely-selected head-related transfer function, and the third generation unit synthesizes the first sound signal with the third sound signal to generate the reproduction signal.

10. The information processing device according to claim 1, wherein the second generation unit separates, as the information indicating the acoustic characteristic in the reproduction environment, a reflection or reverberation component other than a sound signal corresponding to a direct sound from a plurality of sound signals simultaneously recorded by a plurality of microphones in the reproduction environment, and generates the ambisonics format data on a basis of the separated reflection or reverberation component.

11. The information processing device according to claim 10, wherein the first generation unit generates the first sound signal on a basis of the direct sound separated by the second generation unit and a head-related transfer function corresponding to a sound source position of the direct sound.

12. The information processing device according to claim 10, wherein the first generation unit generates the first sound signal on a basis of a sound signal recorded by a measurement means different from the plurality of microphones and installed in a vicinity of a measurement target and a head-related transfer function corresponding to an installation position of the measurement means.

13. An information processing method comprising:

by a computer generating a first sound signal on a basis of positional relationship information indicating a relationship between a listener and a sound source position and a head-related transfer function corresponding to the sound source position;

generating a second sound signal on a basis of ambisonics format data generated from a partial component out of information indicating an acoustic characteristic in a reproduction environment; and generating a reproduction signal by synthesizing the first sound signal with the second sound signal.

14. At least one non-transitory computer-readable medium having instructions encoded thereon that, when executed by a processor, cause the processor to function as:

a first generation unit that generates a first sound signal on a basis of positional relationship information indicating a relationship between a listener and a sound source position and a head-related transfer function corresponding to the sound source position;

a second generation unit that generates a second sound signal on a basis of ambisonics format data generated from a partial component out of information indicating an acoustic characteristic in a reproduction environment; and a third generation unit that generates a reproduction signal by synthesizing the first sound signal with the second sound signal.

* * * * *